US012600249B1

(12) United States Patent　　　　　(10) Patent No.:　US 12,600,249 B1
Sarwat et al.　　　　　　　　　　　　(45) Date of Patent:　Apr. 14, 2026

(54) PASSIVITY-BASED INTEGRAL TERMINAL SLIDING MODE CONTROL FOR SUPPRESSING OUTPUT VOLTAGE OF DYNAMIC WIRELESS CHARGING

(71) Applicants: Arif I. Sarwat, Miami, FL (US); Milad Behnamfar, Miami, FL (US)

(72) Inventors: Arif I. Sarwat, Miami, FL (US); Milad Behnamfar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/264,550

(22) Filed: Jul. 9, 2025

(51) Int. Cl.
　　*B60L 53/12*　　　(2019.01)
　　*H02J 50/12*　　　(2016.01)
　　*B60L 53/20*　　　(2019.01)

(52) U.S. Cl.
　　CPC .............. B60L 53/12 (2019.02); H02J 50/12 (2016.02); B60L 53/20 (2019.02); B60L 2210/12 (2013.01)

(58) Field of Classification Search
　　CPC ............. B60L 53/12–126; B60L 53/34; B60L 53/38–39; H01F 38/14
　　See application file for complete search history.

(56) References Cited

U.S. PATENT DOCUMENTS 12,451,735 B1 * 10/2025 Sarwat .................... B60L 53/60

FOREIGN PATENT DOCUMENTS

CN　　116667486 A　*　8/2023　.......... H02J 7/00712
CN　　117937786 A　*　4/2024　.............. G06F 17/11

OTHER PUBLICATIONS

M. Behnamfar and A. Sarwat, "Integral Terminal Sliding Mode-Based Proportional Integral Control for Mitigating Output Voltage Fluctuation for Dynamic Wireless Charging," Oct. 20, 2024, 2024 IEEE Industry Applications Society Annual Meeting (IAS), Phoenix, AZ, USA, 2024, pp. 1-6 (Year: 2024).*
M. Behnamfar, T. O. Olowu and A. Sarwat, "Passivity-Based Integral Terminal Sliding Mode Control for Suppressing Output Voltage Fluctuations in Dynamic Wireless Charging," Mar. 6, 2025, in IEEE Transactions on Transportation Electrification, vol. 11, No. 4, pp. 9035-9047, Aug. 2025 (Year: 2025).*

(Continued)

*Primary Examiner* — Daniel Cavallari
*Assistant Examiner* — David A Shiao
(74) *Attorney, Agent, or Firm* — SALIWANCHIK, LLOYD & EISENSCHENK

(57) ABSTRACT

A method for suppressing output voltage fluctuations in a dynamic wireless charging (DWC) system for electric vehicles is provided. The method includes performing a passivity-based control step that includes performing an energy shaping stage and performing a damping injection stage to mitigate energy oscillations and enhance stability of the DWC system; deriving an intermediary variable that corresponds to an inductor current and serves as a reference value for the inductor current in a subsequent integral terminal sliding mode control step; and performing the integral terminal sliding mode control step that includes defining a terminal integral sliding surface based on the intermediary variable; selecting a reaching law that satisfies a preset condition; and deriving a formula for determining duty cycles for the DWC system.

20 Claims, 40 Drawing Sheets

(56) References Cited

OTHER PUBLICATIONS

J. Liu, Z. Liu and H. Su, "Passivity-Based PI Control for Receiver Side of Dynamic Wireless Charging System in Electric Vehicles," Jan. 14, 2021, in IEEE Transactions on Industrial Electronics, vol. 69, No. 1, pp. 783-794, Jan. 2022 (Year: 2021).*

English machine translation of CN116667486A published Aug. 29, 2023 (Year: 2023).*

English machine translation of CN117937786A published Apr. 26, 2024 (Year: 2024).*

Z. Alam, T. K. Roy, S. K. Ghosh and M. A. Mahmud, "Control of DCâDC Buck Converters Using Robust Composite Backstepping and Integral Terminal Sliding Mode Approaches,", May 16, 2023, in IEEE Journal of Emerging and Selected Topics in Industrial Electronics, vol. 4, No. 3, pp. 866-877 (Year: 2023).*

Ali, N.; Liu, Z.; Armghan, H.; Ahmad, I.; Hou, Y. LCC-S-Based Integral Terminal Sliding Mode Controller for a Hybrid Energy Storage System Using a Wireless Power System. Mar. 18, 2021. Energies 2021, 14, 1693. (Year: 2021).*

* cited by examiner

TRANSMITTER AND RECEIVER COUPLER DIMENSIONS

| Parameter | Description | value |
|---|---|---|
| $l_{AL}$ | Aluminum plate length | 410mm |
| $w_{AL}$ | Aluminum plate width | 410mm |
| $l_{fe}$ | Ferrite plate length | 370mm |
| $w_{fe}$ | Ferrite plate width | 370mm |
| $w_c$ | Coil's width | 25mm |
| $l_{in,coil}$ | Inner length of coil | 230mm |
| $d_{coil}$ | Distance between adjacent transmitter coils | 50mm |
| $d$ | airgap | 150mm |

FIG. 27

CIRCUIT PARAMETERS

| Parameter | Description | value |
|---|---|---|
| $V_{in}$ | Input voltage | $140V$ |
| $L_{p1}$, $L_{p2}$, $L_{p3}$ | Self-inductance of transmitter coils | $41\mu H$ |
| $L_2$ | Self-inductance of receiver coil | $41\mu H$ |
| $L_{fp1}$, $L_{fp2}$, $L_{fp3}$, $L_{fs}$ | Resonant inductors | $12\mu H$ |
| $C_{fp1}$, $C_{fp2}$, $C_{fp3}$, $C_{fs}$ | Parallel resonant capacitors | $292nF$ |
| $C_{p1}$, $C_{p2}$, $C_{p3}$, $C_2$ | Series resonant capacitor | $120nF$ |
| $C_{b1}$ | Input capacitor of buck converter | $470\mu F$ |
| $C_{b2}$ | Output capacitor of buck converter | $180\mu F$ |
| $L_d$ | Inductor of buck converter | $1mH$ |
| $f_s$ | Operating frequency of inverter | $85kHz$ |
| $f$ | Frequency of buck converter | $20kHz$ |
| $R_L$ | Load resistor | $25\Omega$ |
| $V_{ref}$ | Desired output voltage | $54V$ |

FIG. 28

CONTROL PARAMETER VALUES FOR THE PBITSM CONTROLLER.

| Parameter | value |
|---|---|
| $R_{d3}$ | 1 |
| $K_1$ | 1000 |
| $K_2$ | 1000 |
| $K$ | 1000 |

FIG. 29

COMPARISON WITH DIFFERENT SECONDARY SIDE CONTROL SCHEMES

| | This work | [20] | [21] | [18] | [32] |
|---|---|---|---|---|---|
| Receiver's Controlled component | Buck converter | Buck converter | Buck converter | Three-level buck converter | Dual-input buck converter |
| Control scheme | PBITSM | PIPBC | MPC | Frequency domain PI-based composite | Constant resistance control |
| Number of sensors | Two voltage sensors, one current sensor | Two voltage sensors, one current sensor | Two voltage sensors, one current sensor | Three voltage sensors, two current sensors | Two voltage sensors, one current sensor |
| Finite-time convergence feature | Yes | No | No | No | No |
| Output fluctuation rate during EV motion | $\Delta V$: within 3.3% | Not mentioned | Not mentioned | $\Delta V$: 4.4% | $\Delta V$: 3.1% |

FIG. 30

Circuit parameters and specification

| Parameter | Description | value |
|---|---|---|
| $V_{in}$ | Input voltage | 400 V |
| $L_{p1}, L_{p2}, L_{p3}$ | Self-inductance of transmitter coils | 50 $\mu H$ |
| $C_{p1}, C_{p2}, C_{p3}$ | Primary series resonant capacitors | 70 nF |
| $L_2$ | Self-inductance of receiver coil | 50 $\mu H$ |
| $C_s$ | Secondary resonant capacitor | 70 nF |
| $C_{b1}$ | Input capacitor of buck converter | 100 $\mu F$ |
| $C_{b2}$ | Output capacitor of buck converter | 75 $\mu F$ |
| $L_d$ | Inductor of buck converter | 9 mH |
| $f_s$ | Operating frequency of inverter | 85 kHz |
| $f$ | Frequency of buck converter | 20 kHz |
| $R_L$ | Load resistor | 22 $\Omega$ |
| $V_{ref}$ | Reference value for output voltage | 200 V |

FIG. 31

PASSIVITY-BASED INTEGRAL TERMINAL SLIDING MODE CONTROL FOR SUPPRESSING OUTPUT VOLTAGE OF DYNAMIC WIRELESS CHARGING

BACKGROUND

Electric vehicles (EVs) are increasingly becoming the preferred choice over traditional fossil fuel counterparts, prompting a strategic shift in the automotive industry towards electric propulsion. This transition is driven by concerns about depleting fossil resources and the environmental impact of conventional fuel vehicles. Despite advancements in the design of electric vehicle charging infrastructure, the persistent challenge of range anxiety remains a significant obstacle, impeding EVs widespread public acceptance.

In this context, dynamic wireless charging (DWC) emerges as a promising technology, offering a solution by ensuring a consistent and uninterrupted charging experience for mobile electric vehicles. This effectively alleviates range anxiety and has the potential to reduce the need for larger battery capacities.

There are two types of dynamic wireless charging, categorized by the length of their transmitter coils: the long-track transmitter and the segmented coil array. The long-track transmitter utilizes an elongated transmitter track, significantly larger than the receiver coils, enabling long-distance charging of multiple vehicles simultaneously. However, this type of DWC system faces challenges related to low efficiency and high electromagnetic interference.

In contrast, the segmented coil array type effectively overcomes the drawbacks of the long-track type but introduces output voltage fluctuations as the vehicle traverses multiple transmitter coils. Addressing output voltage fluctuation is crucial in DWC systems due to their potential adverse effects on battery lifespan and overall system efficiency. Moreover, significant fluctuations in output voltage not only complicate the design of the receiver DC-DC converter but also reduce the overall average output power of the DWC system. Therefore, enhancing output stability is a crucial aspect of DWC technology.

Recent research has addressed output fluctuations in DWC systems through the development of magnetic coil structures to mitigate coupling variations and the implementation of control schemes to stabilize output voltage in these systems.

To mitigate output fluctuation, one strategy involves altering coil structures. Numerous studies have explored the optimization of transmitter and receiver dimensions, adjusting coil arrangement, utilizing multi-phase transmitters or multi-phase receivers, incorporating extra coils into the transmitter, and adopting segmented transmitters with alternating unipolar and bipolar coils.

Another aspect to consider in mitigating output voltage fluctuations is the adjustment of compensation networks. In certain investigation, a series-series-parallel (S\SP) compensation net-work topology is introduced, offering insensitivity to coupling variations and, consequently, enabling the attainment of near-constant output voltage. Additionally, a comprehensive design methodology was developed for primary compensation networks in DWC systems, aiming to achieve a uniform power profile. Furthermore, an LCC compensation network was proposed, specifically designed to withstand coupling variations and stabilize output power and voltage.

Control strategies offer an effective avenue for maintaining a consistent output voltage profile. In recent years, there have been diverse proposals for control strategies aimed at mitigating output fluctuations in DWC systems. These strategies fall into three distinct categories: primary side control, secondary side control, and dual side control. While primary side control has the advantage of simplicity, it has limitations in regulating the electric vehicle's battery and necessitates wireless communication between the primary and secondary sides.

In addressing these limitations, secondary side control emerges as a preferred option for controlling DWC systems. In DWC systems, where EVs move swiftly along the transmitter's coils, the mutual coupling between the transmitter and receiver coils undergoes rapid fluctuations, posing a significant challenge in control system design. Traditional control methods may struggle to keep pace with these dynamic changes, resulting in voltage and current fluctuations. Consequently, controllers need the ability to promptly regulate the system's dynamics in response to these rapidly changing parameters.

A frequency domain composite control strategy incorporating Proportional-Integral (PI) control was introduced to address output voltage fluctuations, successfully reducing system output voltage fluctuations within the range of [4.4%, 13%]. In certain investigation, an alternative approach involved implementing a feedforward control strategy, effectively mitigating output fluctuations in the DWC system. This approach notably reduced battery output current ripples to 6.2%, particularly at slower driving speeds. Additionally, in certain investigation passivity-based PI control was leveraged to enhance performance in coping with rapidly changing coupling coefficients. However, it is important to note that this specific approach still resulted in an output current pulsation of approximately 60%. The coupling coefficient within the DWC system undergoes rapid and extensive variations, presenting substantial challenges in control system design and ultimately leading to a degradation in system performance. Control methodologies relying on PI control mechanisms exhibit poor performance in achieving precise tracking control when faced with such rapid changes in the coupling coefficient. Their inability to adapt promptly results in fluctuations in the output voltage and current within the DWC system. Consequently, nonlinear controllers are preferred as control strategies for DWC systems due to their robust response to disturbances. In certain investigation, an approach involving Model Predictive Control (MPC) is deployed for the receiver-side buck converter to suppress output voltage fluctuations in the DWC systems.

Recent research has concentrated on examining the influence of external disturbances and uncertainties within the circuit in DWC systems. These factors contribute to observable voltage fluctuations, posing challenges to the stability and performance of DWC systems. In a recent study, a Model-Free Composite Disturbance Rejection Control (MFC) framework has been proposed to ensure a stable energy supply for EVs. This approach excels at simultaneously estimating external disturbances, circuit uncertainties, and the control input gain of DWC systems. Moreover, in certain investigation, a resilient and adaptive internal model (IM)-based controller is introduced to effectively mitigate sinusoidal disturbances resulting from the movement of EVs with a consistent yet unknown vehicle speed.

The sliding mode control (SMC) method, based on variable structure systems theory, is a robust and popular control tool for power converters, as it simplifies design by reducing system order, decoupling state variables, and eliminating the need for precise parameter modeling through discontinuous control that drives system states along a predefined sliding surface. However, SMC control schemes suffer from chattering in state variables due to unmodeled dynamics and switching delays, which degrade control performance and lead to power losses. The Terminal Sliding Mode Control (TSMC) method provides faster convergence and lower tracking errors than conventional SMC schemes; however, its performance heavily relies on the initial system states and requires the states to be sufficiently close to the sliding surface to guarantee convergence because the convergence rate of the terminal sliding mode surface is slow when the system state is far from the origin. Integral terminal sliding mode control (ITSMC) was developed to avoid the singularity in traditional TSMC methods and address the mismatch problems in nonlinear control systems. Moreover, ITSMC methods enhance dynamic response during load changes and other transients at the system startup, while minimizing overshoots. Recently, the application of passivity-based control (PBC) in power converters has gained significant attention due to its energy-shaping approach, simplicity, and robustness against external perturbations through damping injection to track current or power references. However, the passivity-based control scheme still suffers from poor robustness and slow response speed.

Existing control schemes in the literature aimed at stabilizing the output voltage of DWC systems often lack the crucial property of finite-time convergence, which is essential for effective DWC applications.

BRIEF SUMMARY

There continues to be a need in the art for improved designs and techniques for control for suppressing output voltage of dynamic wireless charging.

In an embodiment of the subject invention, a method for suppressing output voltage fluctuations in a dynamic wireless charging (DWC) system for electric vehicles is provided. The method comprises performing a passivity-based control step that comprises performing an energy shaping stage and performing a damping injection stage to mitigate energy oscillations and enhance stability of the DWC system; deriving an intermediary variable that corresponds to an inductor current and serves as a reference value for the inductor current in a subsequent integral terminal sliding mode control step; and performing the integral terminal sliding mode control step that comprises: defining a terminal integral sliding surface based on the intermediary variable; selecting a reaching law that satisfies a preset condition; and deriving a formula for determining duty cycles for the DWC system. The method may further comprise defining an error between a desired output voltage and a measured output voltage of the DWC system before performing the passivity-based control step. The performing an energy shaping stage comprises defining a state vector as $x=x_d+\tilde{x}$, where $x_d$ is a desired value and $\tilde{x}$ is deviation from the desired value. Moreover, the performing a damping injection stage may comprise defining a damping matrix as $R(x)=R_i(x)-R_d$. The method may further comprise performing a Lyapunov function to analyze finite-time stability of the DWC system.

In another embodiment of the subject invention, a system for suppressing output voltage fluctuations in DWC (e.g., in a DWC device or system) for electric vehicles can comprise: a processor; and a machine-readable medium in operable communication with the processor and having instructions stored thereon that, when executed by the processor, perform the following steps: performing a passivity-based control step that comprises performing an energy shaping stage and performing a damping injection stage to mitigate energy oscillations and enhance stability of the DWC; deriving an intermediary variable that corresponds to an inductor current and serves as a reference value for the inductor current in a subsequent integral terminal sliding mode control step; and performing the integral terminal sliding mode control step that comprises: defining a terminal integral sliding surface based on the intermediary variable; selecting a reaching law that satisfies a preset condition; and deriving a formula for determining duty cycles for the DWC. The instructions when executed can further perform the following step: defining an error between a desired output voltage and a measured output voltage of the DWC before performing the passivity-based control step. The performing an energy shaping stage comprises defining a state vector as $x=x_d+\tilde{x}$, where $x_d$ is a desired value and $\tilde{x}$ is deviation from the desired value. Moreover, the performing a damping injection stage may comprise defining a damping matrix as $R(x)=R_i(x)-R_d$. The instructions when executed can further perform the following step: performing a Lyapunov function to analyze finite-time stability of the DWC.

BRIEF DESCRIPTION OF DRAWINGS

FIG. 27 shows a table with dimensions of transmitter coils and a receiver coil.

FIG. 28 shows a table with circuit parameters descriptions and values.

FIG. 29 shows a table with values for control parameters of a PBITSM control method.

FIG. 30 shows a table with a comprehensive comparison between a control method according to an embodiment of the subject invention and various conventional secondary side control strategies aimed at suppressing output voltage fluctuations, as documented in the literature.

FIG. 31 shows a table with details and values of circuit parameters.

DETAILED DESCRIPTION

Figure 1:
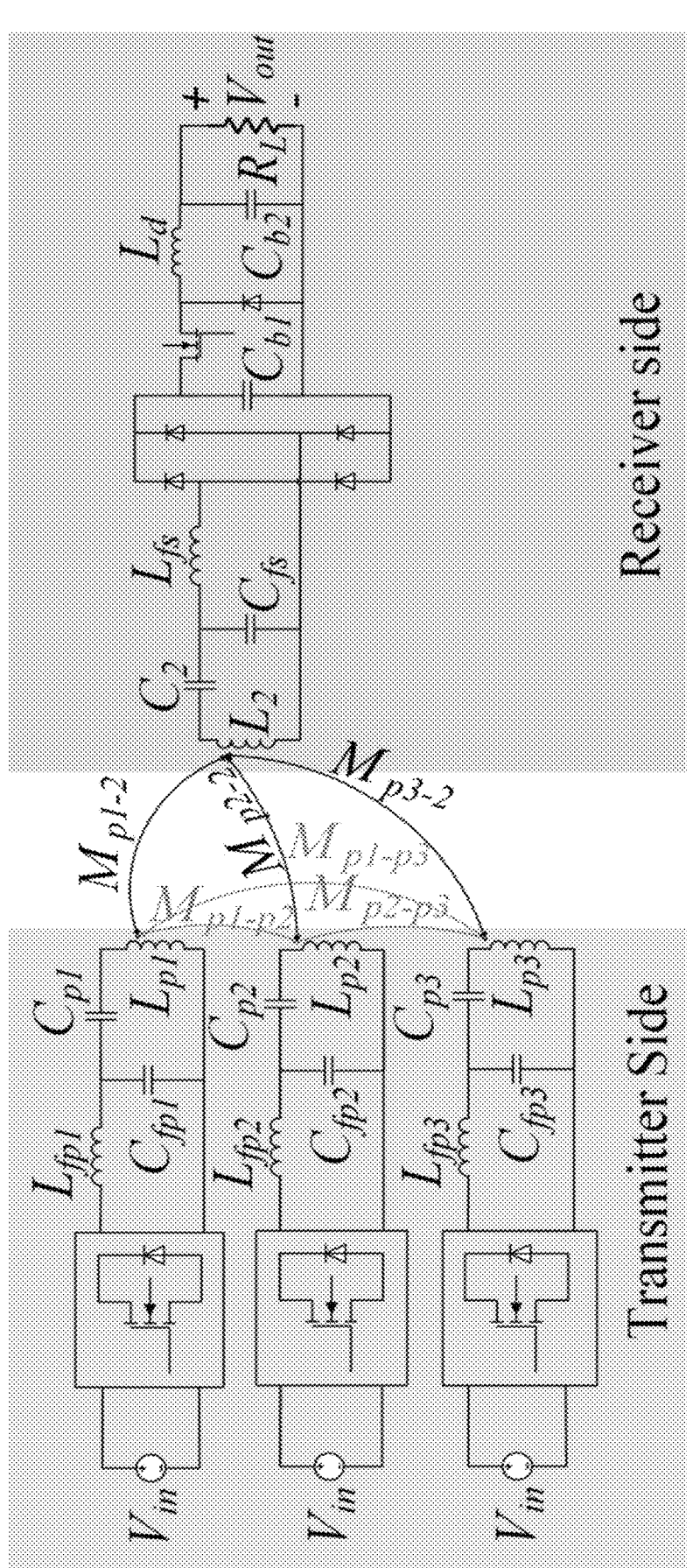
FIG. 1 is a schematic representation showing the circuit topology of the DWC system, according to an embodiment of the subject invention.

Embodiments of the subject invention provide systems and methods for suppressing output voltage fluctuations in dynamic wireless charging (DWC) for electric vehicles.

Dynamic charging is a practical technology in wireless charging of electric vehicles, which enables EVs to be charged while driving. There are two types of dynamic charging based on the transmitter's coil length, which are known as long track transmitter and segmented coil array.

Long track transmitter deployed a transmitter track multiple times larger than the receiver coil but, due to low efficiency and high electromagnetic interference (EMI), is not appropriate. On the other hand, segmented coil arrays in which multiple transmitter coils of the same size as the receiver coil are deployed, resolve the issues of long track type. A segmented coil array resolves the problems of long track transmitter, but this type of transmitter's structure leads to power pulsation at the receiver side. These power pulsations are harmful to the battery's lifetime which should be minimized. There are three areas to minimize the power pulsation which are modifying coil's structure, applying controller and designing compensation network.

According to embodiments of the subject invention, a control method based on the Lyapunov function is provided for suppressing power fluctuation and stabilizing power in the dynamic charging of electric vehicles.

The innovative hybrid control strategy combines passivity-based control with integral terminal sliding mode control methods to address fluctuations in the output voltage of dynamic wireless charging systems for electric vehicles. As a result, the strategy achieves a stable output voltage with minimal 3.3% ripple, even amidst variations in mutual coupling due to receiver movement. Notably, this composite control strategy exhibits characteristics such as finite-time convergence, superior transient performance, and high robustness.

The detailed design procedures of the control method and systems are presented, and the stability of the control method and systems is demonstrated. Simulation results highlight the superiority of the control method and systems of the subject invention in suppressing voltage ripple compared to a conventional PID controller and a passivity-based proportional integral (PIPBC) controller. Moreover, experimental results validate the effectiveness of the control schemes in suppressing output voltage fluctuations during receiver motion and simultaneous load changes.

The embodiments of the subject invention offer several key advantages:

1. The control method and systems are configured to achieve a fast dynamic response to changing in coupling coefficient and load.

2. The control method and systems do not require detection system which makes it cost-effective and practical for dynamic charging applications.

3. The control method and systems are configured to minimize the voltage fluctuations under 3.3% and maintain efficiency around 76% as vehicle travelling.

The control method and systems of the subject invention can be used in dynamic charging of electric vehicles, allowing electric vehicles to be charged in motion.

Example One

To realize control features such as faster response times, enhanced robustness, and better disturbance rejection capabilities, a novel hybrid control method comprising a passivity-based control method and an integral terminal sliding mode control method for suppressing output voltage fluctuations in DWC systems is provided.

The passivity-based integral terminal sliding mode (PBITSM) control method and systems of the subjection invention leverage the strengths of two different control approaches, namely the passivity-based control (PBC) method and the Integral Terminal Sliding Mode Control (ITSMC) method, while compensating for their individual deficiencies.

As discussed earlier, the main challenges of the passivity-based control (PBC) method—specifically slow response speed and poor robustness—can be addressed by the Integral Terminal Sliding Mode Control (ITSMC) method, which provides faster dynamic response and improved robustness.

However, the ITSMC method suffers from chattering, particularly in practical implementations, due to its discontinuous control action. The PBC method, with its smooth energy-shaping characteristics, can reduce the high-frequency oscillations and noise associated with chattering, leading to a more stable control system.

By integrating these two control strategies, dynamic response, mitigate chattering inherent in traditional sliding mode control can be enhanced, improving system robustness, while preserving passivity.

Furthermore, a condition under which finite-time convergence can be guaranteed is identified. These considerations lead to the development of the PBITSM control scheme of the subject invention to enable suppressing voltage fluctuations of the DWC systems.

In contrast to the conventional secondary-side control strategies of DWC systems, the passivity-based integral terminal sliding mode (PBITSM) controller of the subject invention possesses a finite-time convergence property, offering advantages such as faster convergence, increased robustness, and superior disturbance rejection.

Furthermore, unlike the conventional integral terminal sliding mode control strategies, the PBITSM control method of the subject invention effectively mitigates the chattering issue due to its integration of the idea of passivity into sliding mode control, ensuring that the PBITSM control method is more stable and energy-efficient by considering the energy flow in the system. This framework reduces the high-frequency oscillations associated with chattering.

Unlike the conventional secondary-side control strategies, the receiver's speed of the PBITSM control method was investigated in the study and analysis.

In addition, the performance of the PBITSM controller is analyzed under different operating conditions such as load changes and voltage reference changes, while the receiver is in motion.

DESIGN PROCEDURE OF THE PBITSM CONTROL METHOD

FIG. 1 illustrates the circuit topology of the DWC system, featuring a DC-DC buck converter integrated on the vehicle side of the setup. As depicted in FIG. 1, $M_{pj\text{-}2}$ represents the mutual inductance between the $j^{th}$ transmitter coil $L_{pj}$ and the receiver coil $L_2$. Furthermore, $M_{p1\text{-}p2}$ and $M_{p2\text{-}p3}$ denote the mutual inductance between neighboring transmitter coils.

The double-sided LCC compensation network is employed for the DWC system due to its high efficiency. In this setup, $L_{fp1}$, $L_{fp2}$, $L_{fp3}$, and $L_{fs}$ operate as resonant inductors, while $C_{fp1}$, $C_{fp2}$, $C_{fp3}$, and $C_{fs}$ serve as parallel resonant capacitors. Additionally, $C_{p1}$, $C_{p2}$, $C_{p3}$, and $C_2$ function as series resonant capacitors.

The LCC compensation network parameters are well-tuned, which satisfies the following resonance equations:

$$L_{fpi1} \cdot C_{fpi} = \frac{1}{\omega^2} \tag{1}$$

$$L_{fs} \cdot C_{fs} = \frac{1}{\omega^2}$$

$$L_{pi} - L_{fpi} = \frac{1}{\omega^2 C_{pi}}$$

$$L_2 - L_{fs} = \frac{1}{\omega^2 C_2}$$

where $\omega$ denotes the operating angular frequency and i represents the ith transmitter coil.

Figure 2:
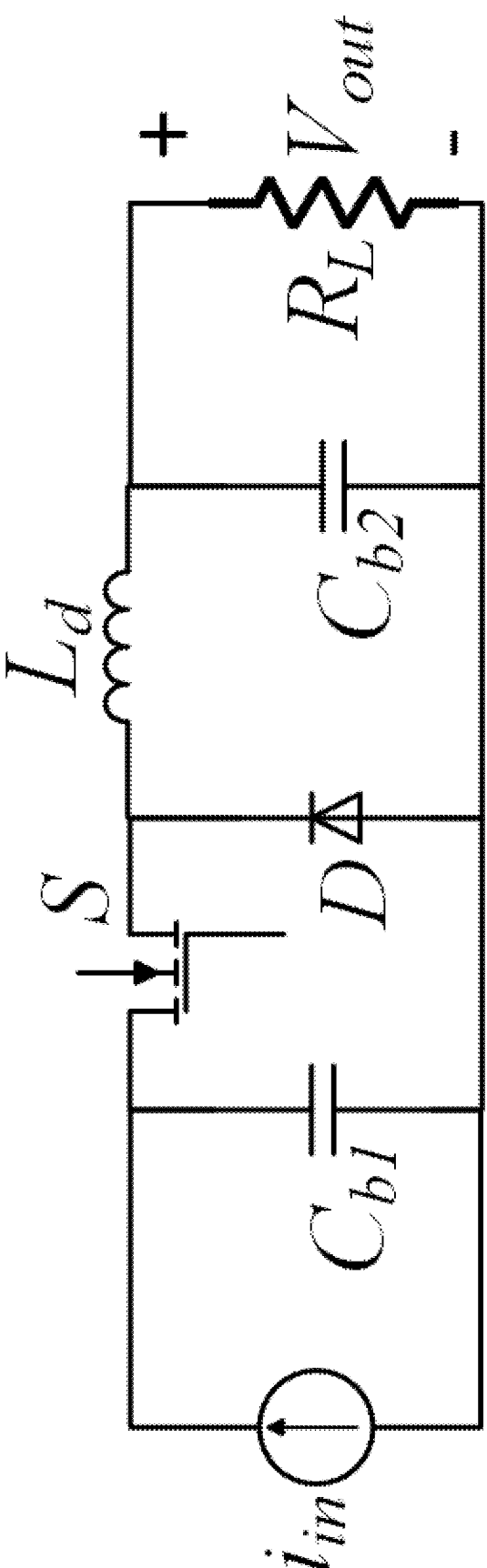
FIG. 2 is a schematic representation showing the equivalent circuit topology of the buck converter at the receiver side, according to an embodiment of the subject invention.

Considering the current source characteristic of the double-sided LCC compensation network, the inductive power transfer (IPT) system, which serves as the input to the DC-DC Buck converter, can be modeled as an ideal current source, denoted as $i_{in}$, as depicted in FIG. 2.

The $i_{in}$ can be expressed as follows:

$$i_{in}(t) = \frac{2\sqrt{2}\sum_{i=1}^{n_t} M_{pi,2} V_{in}}{\pi \omega L_{p1} L_{f2}} |\sin(\omega t)| \tag{2}$$

where $n_t$ is the number of transmitter coils. To derive the average state model of the circuit in FIG. 2, the circuit is analyzed when the switch is on and off.

The first set of equations, when the switch is on (that is, $0 < t < \mu(t)T$), is derived as follows:

$$L_d \frac{di_{L_d}(t)}{dt} = V_{Cb1}(t) - V_{out}(t) \tag{3}$$

$$C_{b1} \frac{dV_{Cb1}(t)}{dt} = i_{in}(t) - i_{Ld}(t)$$

$$C_{b2} \frac{dV_{out}(t)}{dt} = i_{Ld}(t) - \frac{V_{out}(t)}{R_L}$$

The following equations correspond to the period when the switch is off (that is, $\mu(t)T < t < T$):

$$L_d \frac{di_{L_d}(t)}{dt} = -V_{out}(t) \tag{4}$$

$$C_{b1} \frac{dV_{Cb1}(t)}{dt} = i_{in}(t)$$

$$C_{b2} \frac{dV_{out}(t)}{dt} = i_{Ld}(t) - \frac{V_{out}(t)}{R}$$

The average current $i_{Ld}(t)$ in a switching cycle is derived as follows:

$$[i_{Ld}(t)]_T = \frac{1}{T}\int_0^T i_{Ld}(\tau)d\tau \tag{5}$$

$$= \frac{1}{T}\left(\int_0^{\mu(t)T} i_{Ld}(\tau)d\tau + \int_{\mu(t)T}^T i_{Ld}(\tau)d\tau\right)$$

-continued $$= \frac{1}{T}\left( \int_0^{\mu(t)T} (V_{Cb1}(\tau) - V_{out}(\tau))d\tau - \int_{\mu(t)T}^T V_{out}(\tau)d\tau \right)$$

$$= ([V_{Cb1}(t)]_T - [V_{out}(t)]_T)(\mu(t)) + (-[V_{out}(t)]_T(1 - \mu(t)))$$

$$= \mu(t)[V_{Cb1}(t)]_T - [V_{out}(t)]_T$$

The same process can be employed to derive the averages of $V_{Cb1}(t)$ and $V_{out}(t)$. The final equations for the average-state model of the buck converter can be derived as follows:

$$L_d \frac{d[i_{Ld}(t)]_T}{dt} = \mu(t)[V_{Cb1}(t)]_T - [V_{out}(t)]_T \qquad (6)$$

$$C_{b1} \frac{d[V_{Cb1}(t)]_T}{dt} = [i_{in}(t)]_T - \mu(t)[i_{Ld}(t)]_T$$

$$C_{b2} \frac{d[V_{out}(t)]_T}{dt} = [i_{Ld}(t)]_T - \frac{[V_{out}(t)]_T}{R_L}$$

where $[i_{Ld}(t)]_T$, $[V_{Cb1}(t)]_T$, and $[V_{out}(t)]_T$ are the average values of $i_{Ld}(t)$, $V_{Cb1}(t)$, and $V_{out}(t)$, respectively.

Moreover, $C_{b1}$, $C_{b2}$, and Ld are the input capacitor, output capacitor, and inductor of the buck converter, respectively. $V_{Cb1}(t)$, $V_{out}(t)$, $i_{Ld}(t)$, and $\mu(t)$ represent the voltage across the input capacitor, the output capacitor voltage, the inductor current, and the duty cycle of the buck converter, respectively.

The design process of the PBITSM control method and systems of the subject invention begins with the definition of the following error in Equation (7):

$$e_1(t) = V_{out}(t) - V_{out}^* \qquad (7)$$

wherein V_out represents the actual output voltage of the DWC system, while the V_out* represents the reference or desired output voltage that the controller is configured to achieve.

The passivity-based control method is constructed based on the Euler-Lagrange (EL) representation, which can be written as expressed in Equation (8):

$$M\dot{x} + (J + R(x))x = G\mu(t) + d \qquad (8)$$

where $x \in \mathbb{R}^n$ is the state vector, $\mu \in \mathbb{R}^m$ (where m<n) is the control action, and M>0 is the generalized inertia. The $J(x)=-f^T(x)$ and $R(x)=R^T(x)>0$ are defined as the natural interconnection and damping matrices, respectively.

The state vector is defined as $x=[i_{Ld}(t), V_{Cb1}(t), V_{out}(t)]^T$ and the stored energy can be expressed by Equation (9):

$$H = \frac{1}{2}x^T M x = \frac{1}{2}L_d(i_{Ld}(t))^2 + \frac{1}{2}C_{b1}(V_{Cb1}(t))^2 + \frac{1}{2}C_{b2}(V_{out}(t))^2 \qquad (9)$$

The matrices M, J, R(x), G and d are expressed as follows:

$$M = \begin{bmatrix} L_d & 0 & 0 \\ 0 & C'_{b1} & 0 \\ 0 & 0 & C'_{b2} \end{bmatrix}, J = \begin{bmatrix} 0 & 0 & 1 \\ 0 & 0 & 0 \\ -1 & 0 & 0 \end{bmatrix}$$

-continued $$R(x) = \begin{bmatrix} 0 & 0 & 0 \\ 0 & 0 & 0 \\ 0 & 0 & \frac{1}{R_L} \end{bmatrix}, G = \begin{bmatrix} V_{Cb1}(t) \\ -i_{Ld}(t) \\ 0 \end{bmatrix}, d = \begin{bmatrix} 0 \\ i_{in}(t) \\ 0 \end{bmatrix}$$

The passivity-based control method employs a two-stage approach to effectively mitigate energy oscillations in inductors and capacitors. This is achieved by integrating damping gains into the control strategy, contributing to enhanced stability and performance.

These two stages are known as the energy shaping stage and the damping injection stage. For the energy shaping stage, we rewrite the state vectors as $x=x_d+x\tilde{x}$, where $x_d$ is the desired value ($x_d=[i_{Ld}^*, V_{Cd1}^*, V_{out}^*]^T$) and i is the deviation from the desired value. Substituting them into Equation (8), we obtain:

$$M\dot{\tilde{x}} + [J + R(x)]\tilde{x} = G\mu(t) + d - (M\dot{x}_d + [J + R(x)]x_d) \qquad (10)$$

For the damping injection stage, damping matrix can be rewritten as $R(x)=R_i(x)-R_d$, where:

$$R_d = \begin{bmatrix} R_{d1} & 0 & 0 \\ 0 & \frac{1}{R_{d2}} & 0 \\ 0 & 0 & \frac{1}{R_{d3}} \end{bmatrix}, R_i(x) = \begin{bmatrix} R_{d1} & 0 & 1 \\ 0 & \frac{1}{R_{d2}} & 0 \\ 0 & 0 & \frac{1}{R_{d3}} + \frac{1}{R_L} \end{bmatrix}$$

Then by substituting $R(x)=R_i(x)-R_d$ into Equation (10), following equation can be derived:

$$M\dot{\tilde{x}} + [J + R_i(x)]\tilde{x} = G\mu(t) + d - (M\dot{x}_d + [J + R(x)]x_d) + R_d\tilde{x} \qquad (11)$$

The introduction of virtual resistances ensures the dissipation of transient energy within the system, aligning with the principles of Lyapunov stability. Consequently, the system achieves complete passivity, leading the left-hand side of (11) to converge to a globally asymptotically stable equilibrium point, denoted as $\tilde{x} \approx 0$. This establishes a foundation for a stable control design, which can be further pursued by characterizing Equation (11) as expressed in Equation (12):

$$G\mu(t) + d - (M\dot{x}_d + [J + R(x)]x_d) + R_d\tilde{x} = 0. \qquad (12)$$

Since the reference values are constant, $\dot{x}_d=0$. Then, the matrix in (12) can be expanded and each row can be extracted as expressed in Equation group (13):

$$V_{Cb1}(t)\mu(t) - V_{out}(t) + R_{d1}(i_{Ld}(t) - i_{Ld}^*(t)) = 0 \qquad (13)$$

$$-i_{Ld}(t)\mu(t) + i_{in}(t) + \frac{1}{R_{d2}}(V_{Cb1}(t) - V_{Cb1}^*(t)) = 0$$

$$i_{Ld}(t) - \frac{1}{R_L}V_{out}(t) + \frac{1}{R_{d3}}(V_{out}(t) - V_{out}^*) = 0$$

The first and second expressions of Equation group (13) cannot be selected due the presence of $\mu(t)$. Therefore, the third expression can be chosen. As $i_{Ld}(t)$ emerges in the equation, an intermediary variable ($\phi(t)$) corresponding to $i_{Ld}(t)$ (that is, $\phi(t) \approx i_{Ld}(t)$) is introduced. This variable acts as the reference value for the inductor current in the integral terminal sliding mode control. The variable $\phi(t)$ can be expressed as follows:

$$\phi(t) = \frac{1}{R_L} V_{out}(t) - \frac{1}{R_{d3}}(V_{out}(t) - V_{out}^*) \tag{14}$$

The next step involves designing the integral terminal sliding mode control method by defining the terminal integral sliding surface as follows:

$$s(t) = e_2(t) + K_1 \int_0^t e_2(t)dt + K_2 \int_0^t e_2^{\frac{q}{p}}(t)dt \tag{15}$$

where $e_2(t) = i_{Ld}(t) - \phi(t)$. The derivative of Equation (15) can be expressed as Equations (16)-(18):

$$\dot{s}(t) = \dot{e}_2(t) + K_1 e_2(t) + K_2 e_2^{\frac{q}{p}}(t) \tag{16}$$

$$\dot{s}(t) = \left(\dot{i}_{Ld}(t) - \dot{\phi}(t)\right) + K_1 \ (i_{Ld}(t) - \phi(t)) + K_2 \ (i_{Ld}(t) - \phi(t))^{\frac{q}{p}} \tag{17}$$

$$-\left(\frac{1}{R_L} - \frac{1}{R_{d3}}\right)\left(\frac{i_{Ld}(t)}{C_{b2}} - \frac{V_{out}(t)}{R_L C_{b2}}\right) + K_2 \ (i_{Ld}(t) - \phi(t))^{\frac{q}{p}} \tag{18}$$

Choosing a suitable reaching law that satisfies $\dot{s}(t)s(t) \leq 0$ (that is, the reaching condition) is crucial for determining the control law. To ensure $\dot{s}(t)s(t) \leq 0$, the reaching law can be formulated in the following manner:

$$\dot{s}(t) = -\eta \text{sign}(s(t)) - Ks(t) \tag{19}$$

where $\eta$ and K are positive gains. Combining Equations (18) and (19), we obtain:

$$-\eta \text{sign}(s(t)) - Ks(t) = - \tag{20}$$

$$\left(\frac{1}{R_L} - \frac{1}{R_{d3}}\right)\left(\frac{i_{Ld}(t)}{C_{b2}} - \frac{V_{out}(t)}{R_L C_{b2}}\right) +$$

$$\left(\frac{\mu V_{Cb1}(t)}{L_d} - \frac{V_{out}(t)}{L_d}\right) + K_1 (i_{Ld}(t) - \phi(t)) K_2 \ (i_{Ld}(t) - \phi(t))^{\frac{q}{p}}$$

By substituting $e_2(t) = i_{Ld}(t) - \phi(t)$, the duty cycle ($\mu(t)$) can be derived as expressed in Equation (21):

$$\mu(t) = \frac{1}{V_{Cb1}(t)}\left[V_{out}(t) + \frac{L_d}{C_{b2}}\left(\frac{1}{R_L} - \frac{1}{R_{d3}}\right)\left(i_{Ld}(t) - \frac{V_{out}(t)}{R_L}\right)\right.$$

$$\left. + L_d\left(-\eta \text{sign}(s(t)) - Ks(t) - K_1 e_2(t) - K_2 \ (e_2(t))^{\frac{q}{p}}\right)\right] \tag{21}$$

Figure 3:
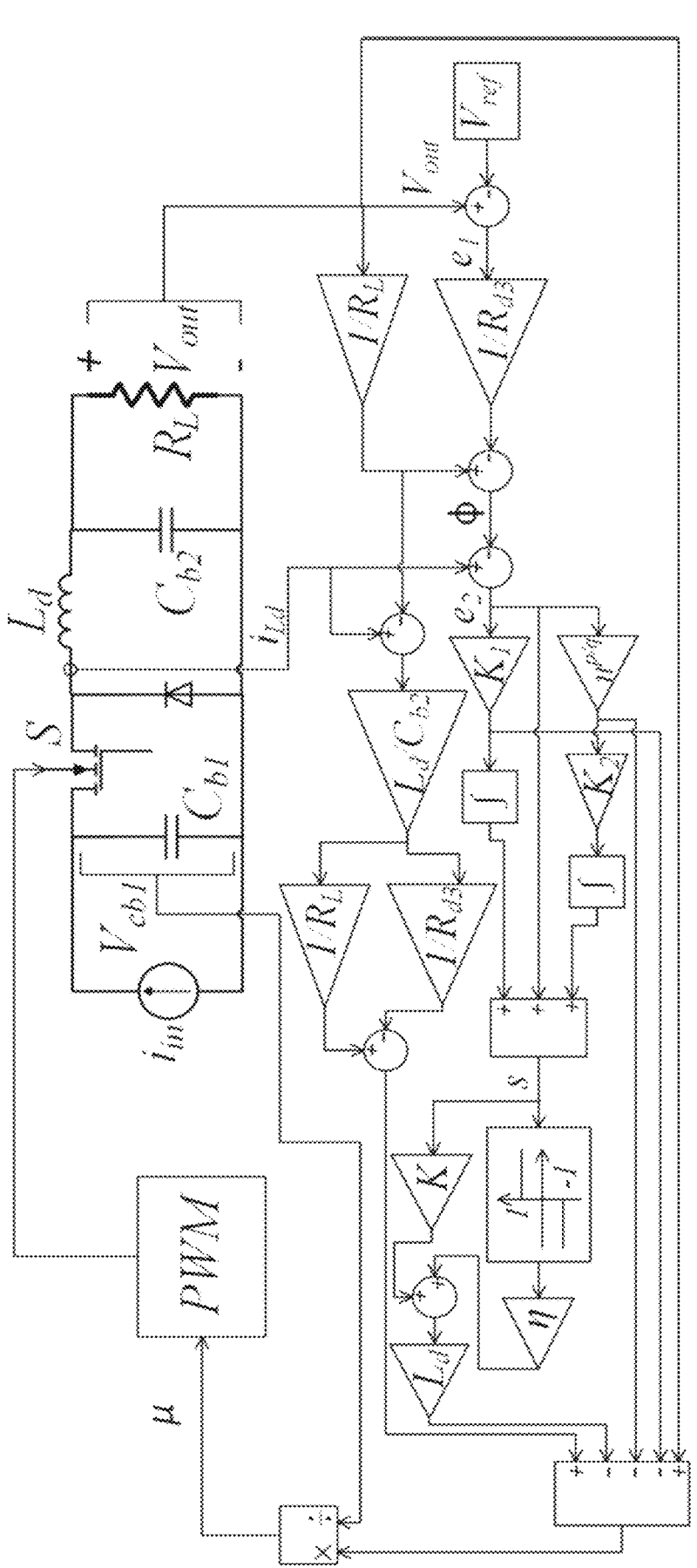
FIG. 3 is a schematic representation showing the control block diagram of the passivity-based integral terminal sliding mode (PBITSM) controller, according to an embodiment of the subject invention.

FIG. 3 shows the block diagram of the PBITSM control method. To analyze its finite-time stability, the Lyapunov function in Equation (22) is selected:

$$W(t) = \frac{1}{2}e_1^2(t) + \frac{1}{2}s^2(t) \tag{22}$$

Equation (22) meets the Lyapunov criteria, including W (0)=0, W (t)>0 if t≠0, and W (t)→∞ if |t|→∞.

According to Lyapunov's stability theory, the system stability is assured if $\dot{W}(t)<0$. Hence, the derivative of the Lyapunov function is obtained as expressed in Equation (23):

$$\dot{W}(t) = -e_1(t)\left(\frac{e_1(t)}{C_{b2}R_{d3}}\right) - (s(t) \ (\eta \text{sign}(s(t)) + Ks(t)) \tag{23}$$

Equation (23) can be simplified as Equation (24):

$$\dot{W}(t) = -\frac{e_1^2(t)}{C_{b2}R_{d3}} - s(t)\eta \text{sign}(s(t)) - Ks^2(t) \tag{24}$$

Since Equation (24) proves that $\dot{W}(t)<0$, it is indicated that the system governed by the control method expressed in Equation (21) exhibits asymptotic stability. To achieve finite-time stability, some conditions for the control method need to be derived. Based on the finite-time stability theory, to prove the finite-time stability of a system, Equation (25) has to be satisfied.

$$\dot{W}(t) + \beta(W(t))^\alpha \leq 0 \tag{25}$$

where $\beta>0$ and $0<\alpha<1$. By selecting $$\alpha = \frac{1}{2},$$

we can rewrite Equation (25) as Equation (26):

$$-\frac{e_1^2(t)}{C_{b2}R_{d3}} - s(t)\eta \text{sign}(s(t)) - Ks^2(t) + \beta\left(\frac{1}{2}e_1^2(t) + \frac{1}{2}s^2(t)\right)^{\frac{1}{2}} \leq 0 \tag{26}$$

We can rewrite Equation (26) as Equation (27):

$$-\left(\frac{e_1^2(t)}{C_{b2}R_{d3}} + s(t)\eta \text{sign}(s(t)) + Ks^2(t)\right) + \beta\sqrt{\left(\frac{1}{2}e_1^2(t) + \frac{1}{2}s^2(t)\right)} \leq 0 \tag{27}$$

To simplify Equation (27), we derive the value of P in such a way that the coefficient of $s^2(t)$ becomes zero, as expressed in Equation (28):

$$\left(\frac{\beta}{2} - \sqrt{\left(\frac{1}{2}e_1^2(t) + \frac{1}{2}s^2(t)\right)}K\right)s^2(t) = 0 \tag{28}$$

By solving Equation (28), $\beta$ can be derived as Equation (29):

$$\beta = 2K\sqrt{\frac{1}{2}e_1^2(t) + \frac{1}{2}s^2(t)} \qquad (29)$$

Since K is a positive gain and the expression under the square root is positive, we can ensure that $\beta > 0$. By substituting Equation (29) into Equation (27), we can write Equation (27) as Equation (30):

$$\sqrt{\left(\frac{1}{2}e_1^2(t) + \frac{1}{2}s^2(t)\right)}\left[\left(K - \frac{1}{C_{b2}R_{d3}}\right)e_1^2(t) - s(t)\eta\mathrm{sign}(s(t))\right] \le 0 \qquad (30)$$

To ensure finite-time stability of the control method, the condition specified in Equation (30) must be satisfied. Therefore, the parameter K should meet the following condition:

$$K \le \frac{1}{C_{b2}R_{d3}} \qquad (31)$$

Simulation Results

Figure 4:
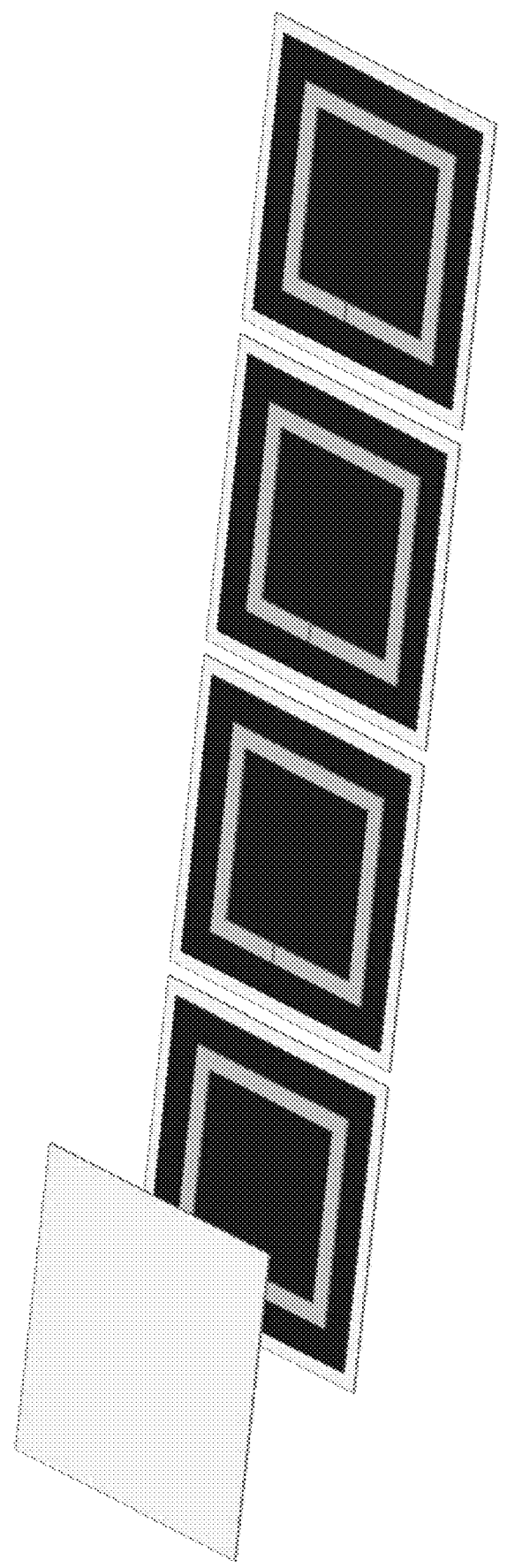
FIG. 4 is a 3D view of the coupler structure, according to an embodiment of the subject invention.

The variation in voltage at the receiver can primarily be attributed to changes in mutual inductance between the transmitter and receiver pads during the transition of the electric vehicle from one transmitter pad to another. FIG. 4 illustrates the inductive coupler employing unipolar coils on both the transmitter and receiver sides. The dimensions of the transmitter coils and receiver coil are listed in the table in FIG. 27.

The proper selection of control parameters is essential for achieving faster convergence and an improved dynamic response. In the PBITSM control scheme, four key parameters—$R_{d3}$, $K_1$, $K_2$, and K—must be carefully selected. The parameter $R_{d3}$ represents the virtual damping resistance in the passivity-based control design, which plays a critical role in accelerating convergence. As per Equation (24), $R_{d3}$ should be small enough to enhance the stability of the system. There is no set threshold for the parameter $R_{d3}$. Its optimal value is typically found through trial and error. For instance, $R_{d3}$ could be set to 1, or any value less than 10.

Figure 5:
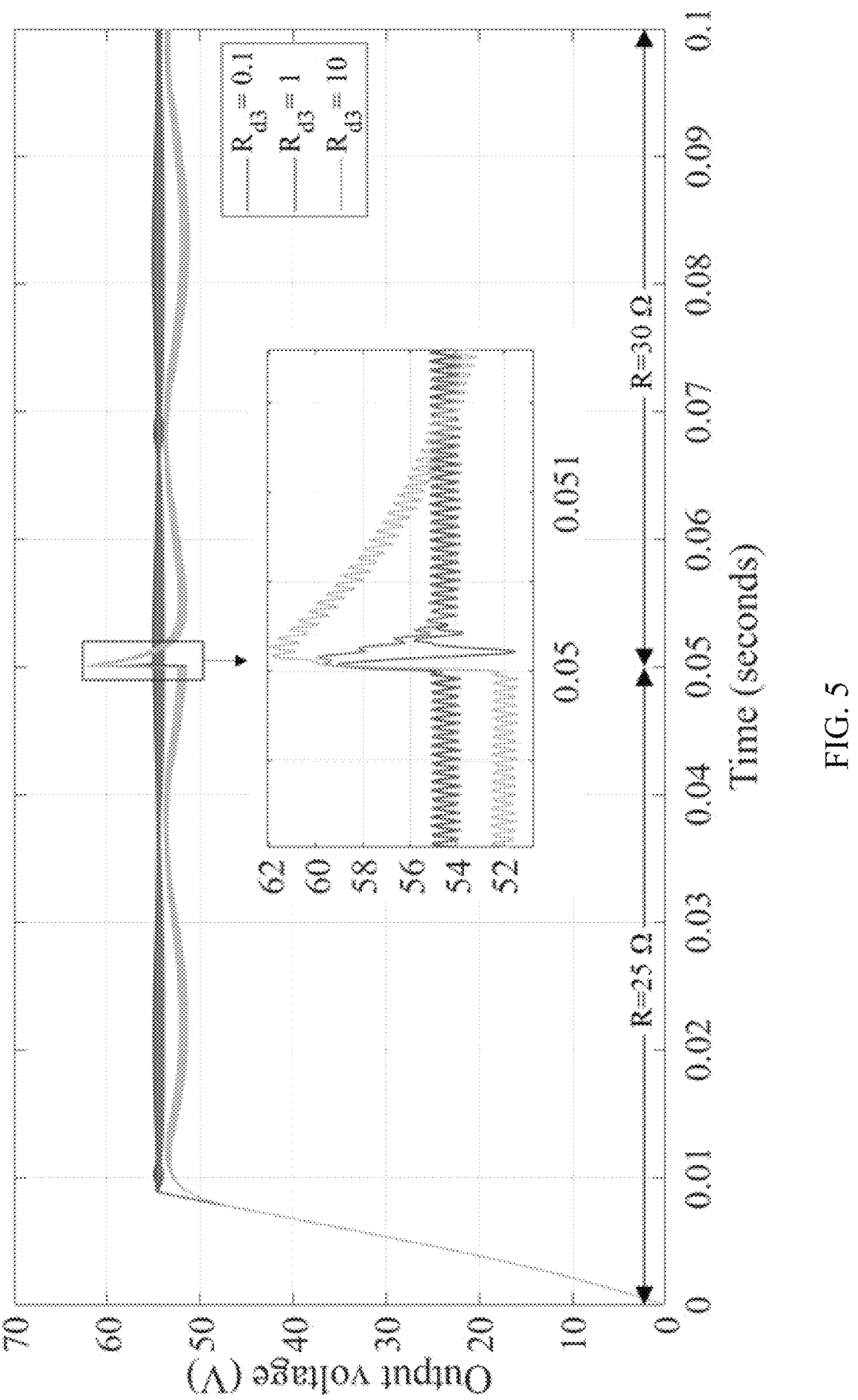
FIG. 5 is a plot diagram showing the output voltage of the DWC during receiver motion with a load transition for different values of $Rd_3$, according to an embodiment of the subject invention.

FIG. 5 shows the output voltage of the DWC during receiver motion, with a load change occurring at 0.05 seconds, for different values of $R_{d3}$. When $R_{d3} = 0.1$, both overshoot and undershoot are observed in the output voltage responses.

In contrast, when $R_{d3} = 1$, the output voltage exhibits only an overshoot, without undershoot. Furthermore, when $R_{d3}$ is increased to 10, the output voltage fails to effectively track the reference value, displaying a larger overshoot and slower convergence.

In one embodiment, based on this analysis, the optimal value of $R_{d3}$ is determined to be 1.

Figure 6:
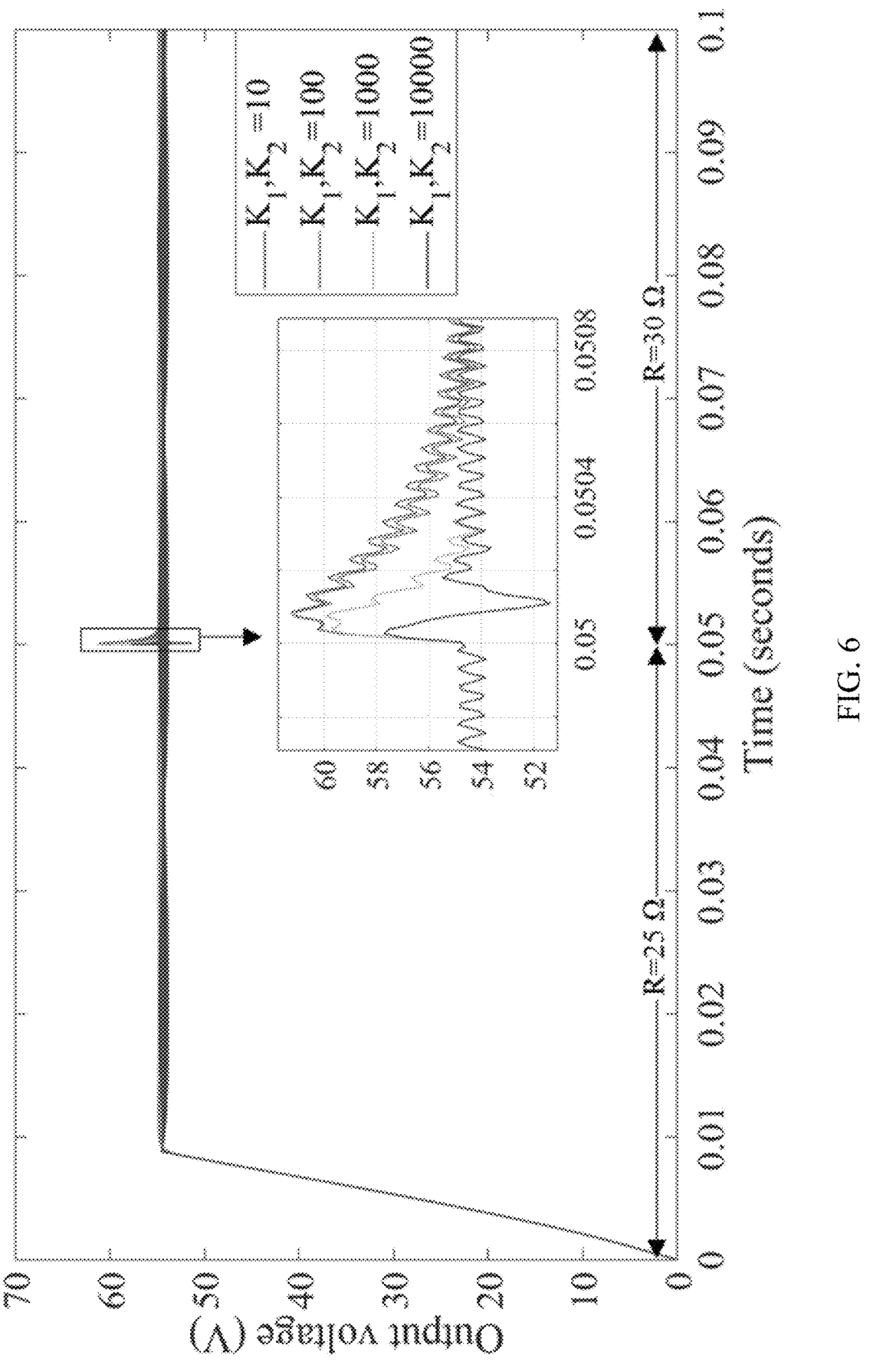
FIG. 6 is a plot diagram showing the output voltage of the DWC during receiver motion with a load change, for varying values of $K_1$ and $K_2$, according to an embodiment of the subject invention.
Figure 7A:
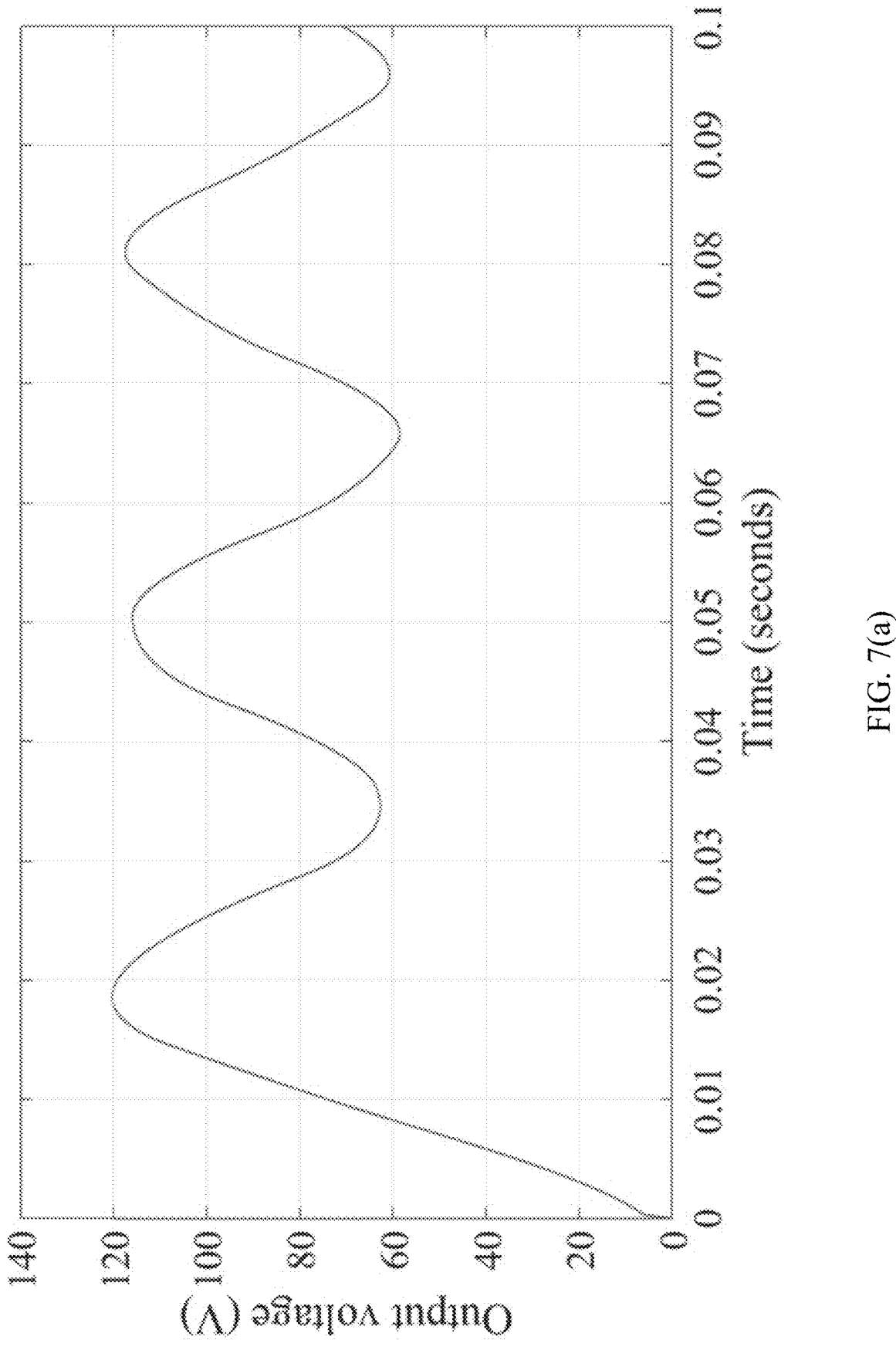
FIGS. 7(a)-7(d) are plot diagrams showing the output voltage of the DWC system during receiver travel at a speed of 50 km/h, according to an embodiment of the subject invention.
Figure 7B:
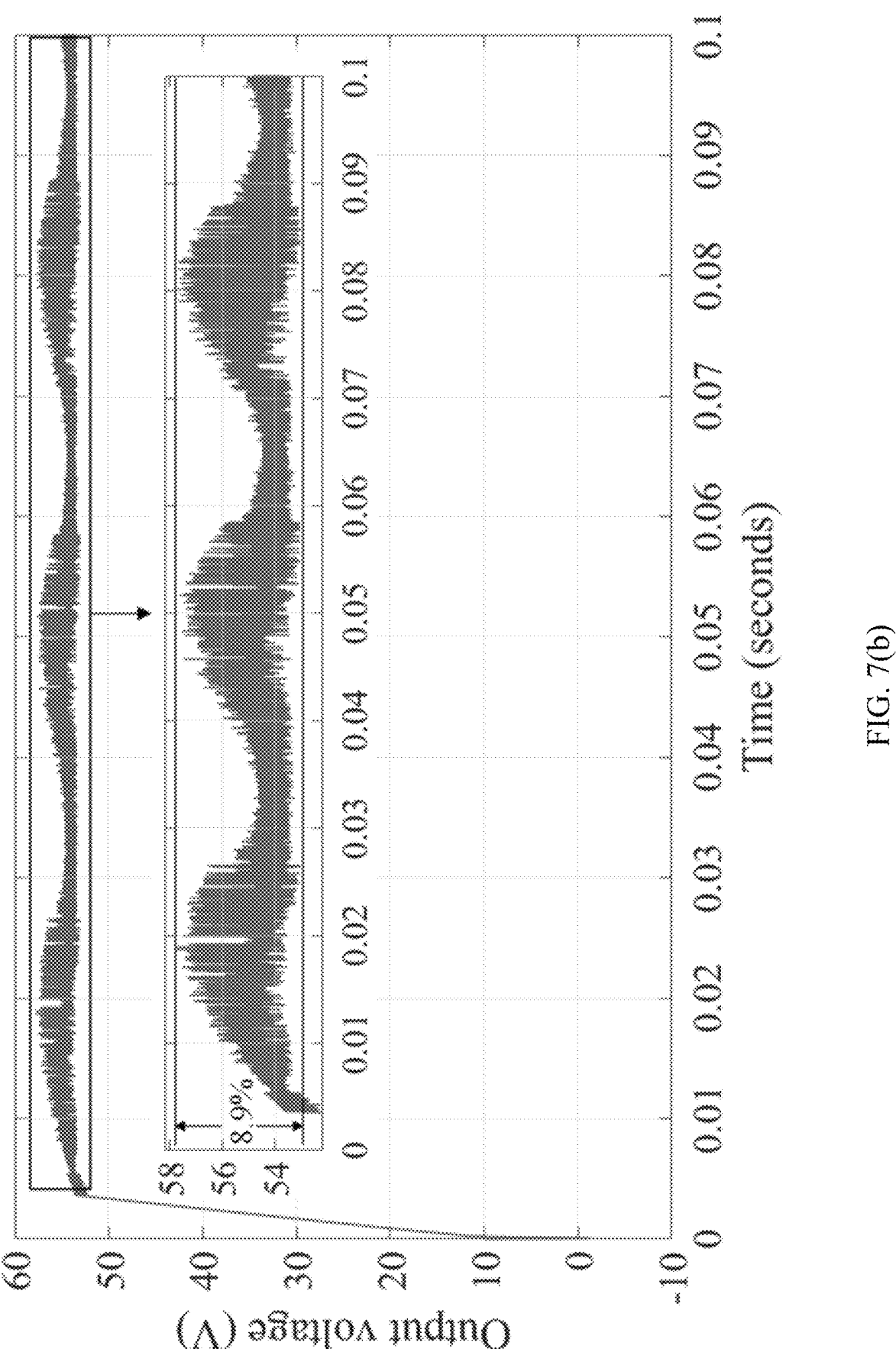
Figure 7C:
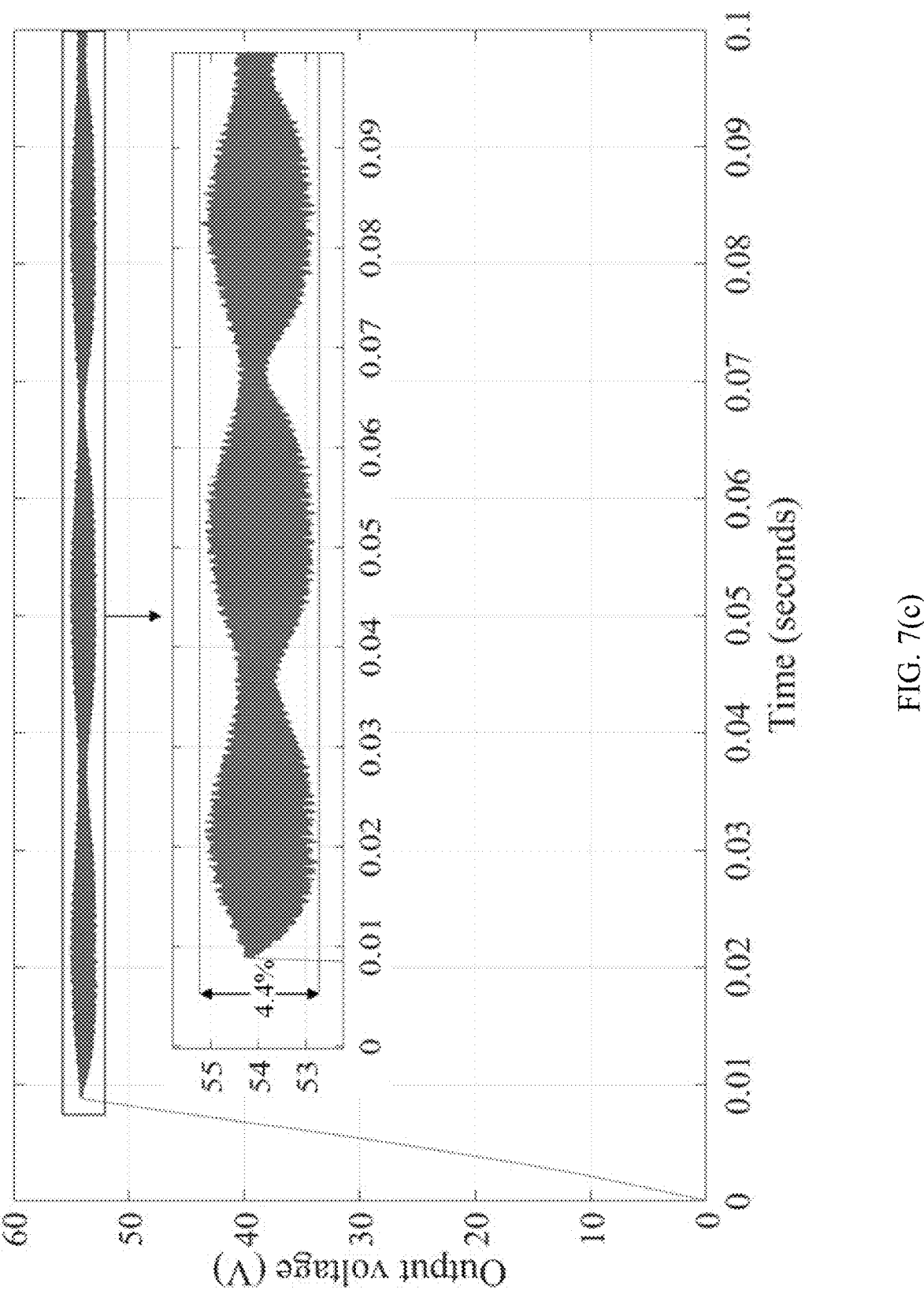
Figure 7D:
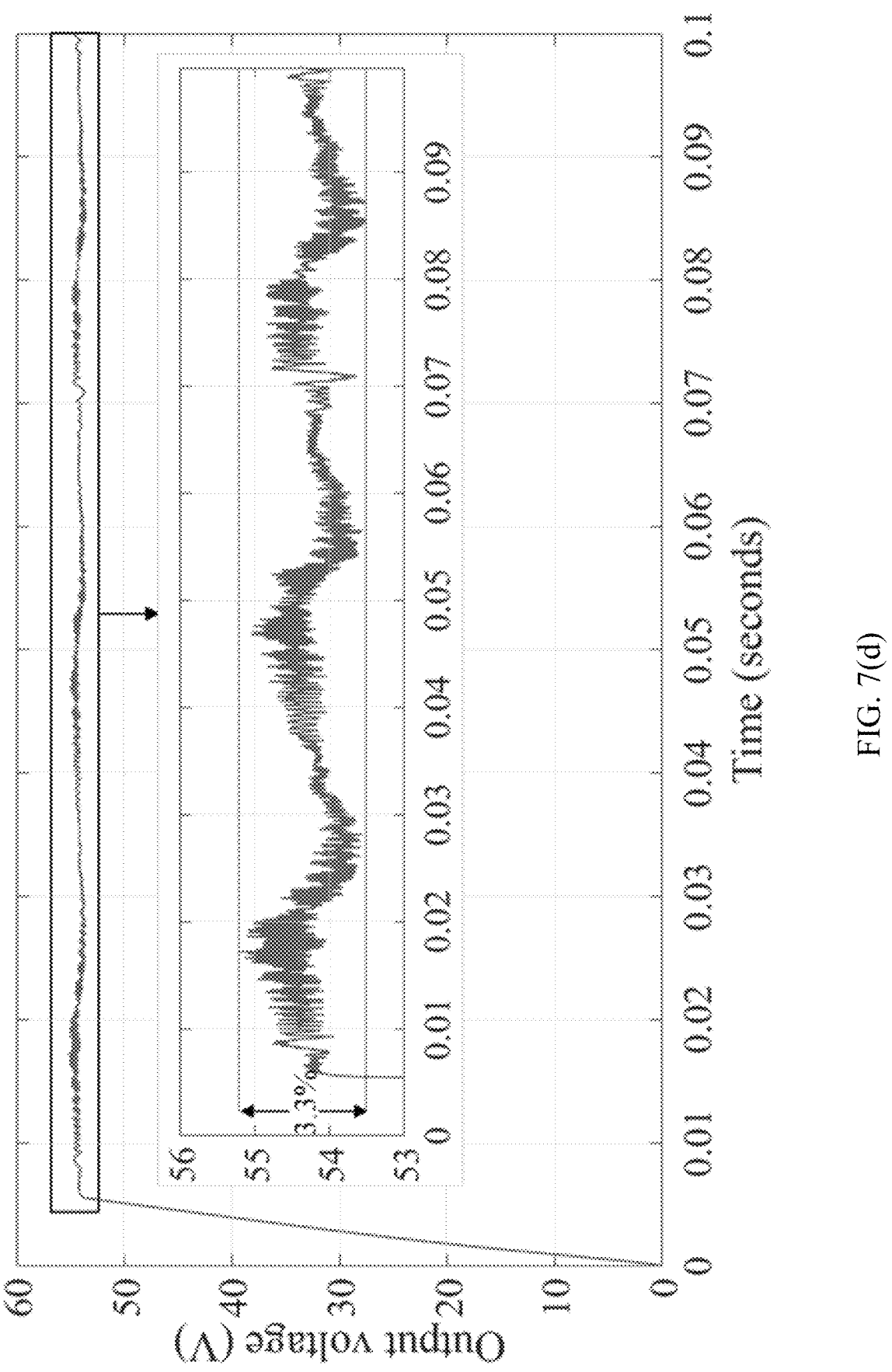

The parameters $K_1$ and $K_2$, which define the integral terminal sliding surface, must be sufficiently large to enhance system stability, as indicated by Equation (24). FIG. 6 shows the output voltages of the DWC system during receiver motion with a load change, when varying values of $K_1$ and $K_2$.

As shown in this figure, low values of these parameters (for example, $K_1$, $K_2 = 10$ and $K_1$, $K_2 = 100$) lead to larger overshoot and slower convergence. Conversely, very high values of these parameters (for example, $K_1$ or $K_2 = 10,000$) result in both overshoot and undershoot during the load transition. It is evident that when $K_1$ or $K_2 = 1000$, the output voltage exhibits a better response, with smaller overshoot and faster convergence, compared to the lower values, and without the occurrence of undershoot. Based on this analysis, the values of $K_1$, $K_2$ are set to 1000. Moreover, to satisfy the finite-time stability condition expressed in Equation (31), the parameter K is set to 1000. The values for the control parameters of the PBITSM control method are listed in the table in FIG. 29.

As stated earlier, the main aim of the PBITSM control method is to minimize the voltage variation that emanates from this variation in coupling coefficient between the transmitter and the receiver pad mounted on the electric vehicle. To validate the efficacy of the PBITSM control method, its performance is assessed while the receiver is in motion and is compare with performances of other control methods. In all testing conditions, the receiver moves at a speed of 50 km/h, causing the mutual coupling to vary. The table in FIG. 28 presents the circuit parameters descriptions and values.

FIG. 7 illustrates the output voltage of the DWC system as the receiver travels over the transmitter coils at a speed of 50 km/h under different control method: no control method applied (OPEN), the PI control method, the passivity-based proportional-integral (PIPBC) control method, and the PBITSM control method of the subject invention.

The comparison reveals that the PBITSM control method is configured to exhibit transient performance superior to other control methods, achieving faster settling times without overshoot. Furthermore, under the PBITSM control method, the voltage fluctuation of the DWC is nearly 3.3%, whereas the PI control method and PIPBC control method show voltage ripples of 8.9% and 4.4%, respectively, as depicted in FIG. 7.

Figure 8A:
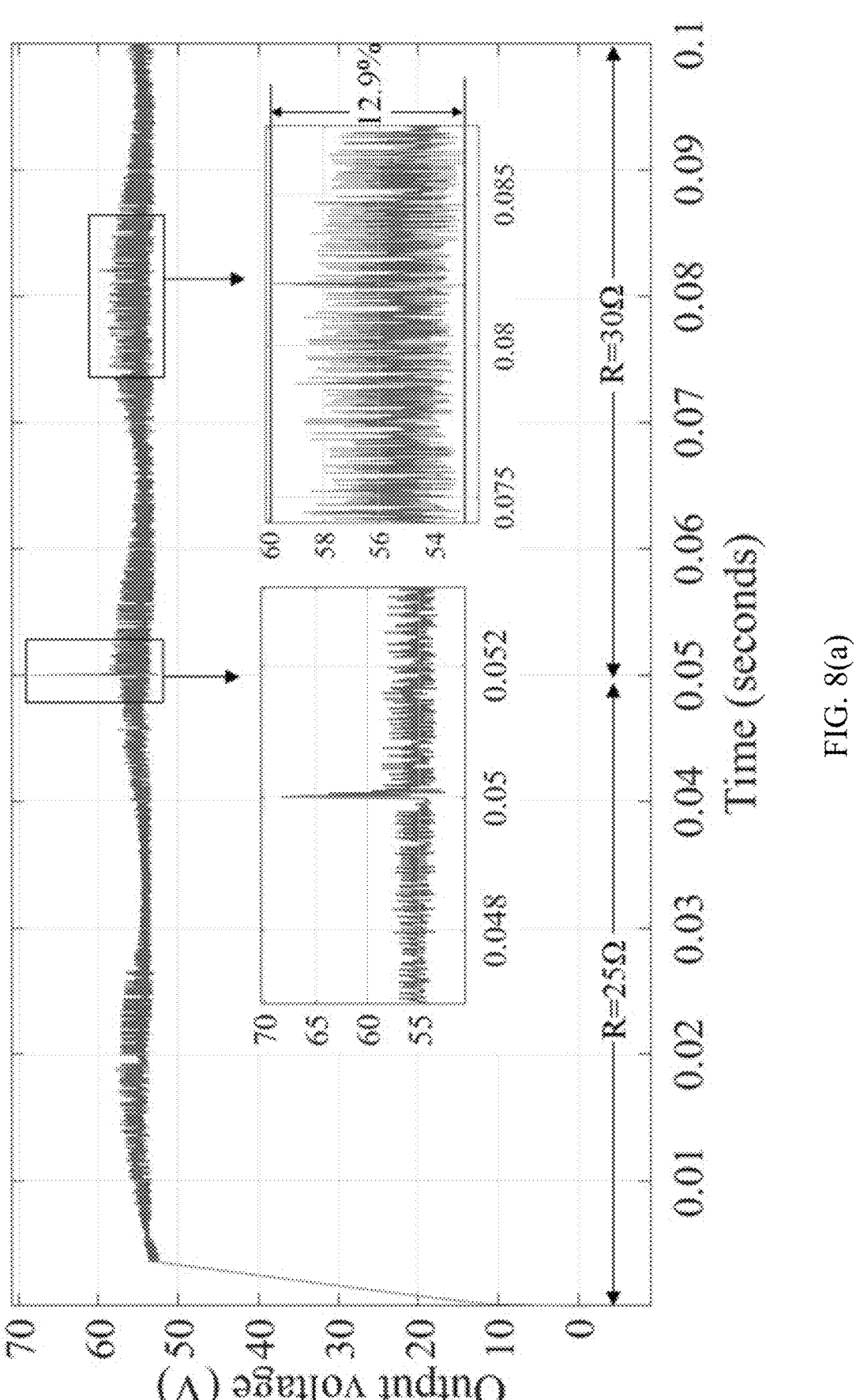
FIGS. 8(a)-8(c) are plot diagrams showing the output voltage of the DWC system when the receiver is in motion at a speed of 50 km/h and the load is changing from 25Ω to 30Ω at 0.05 seconds, according to an embodiment of the subject invention.
Figure 8B:
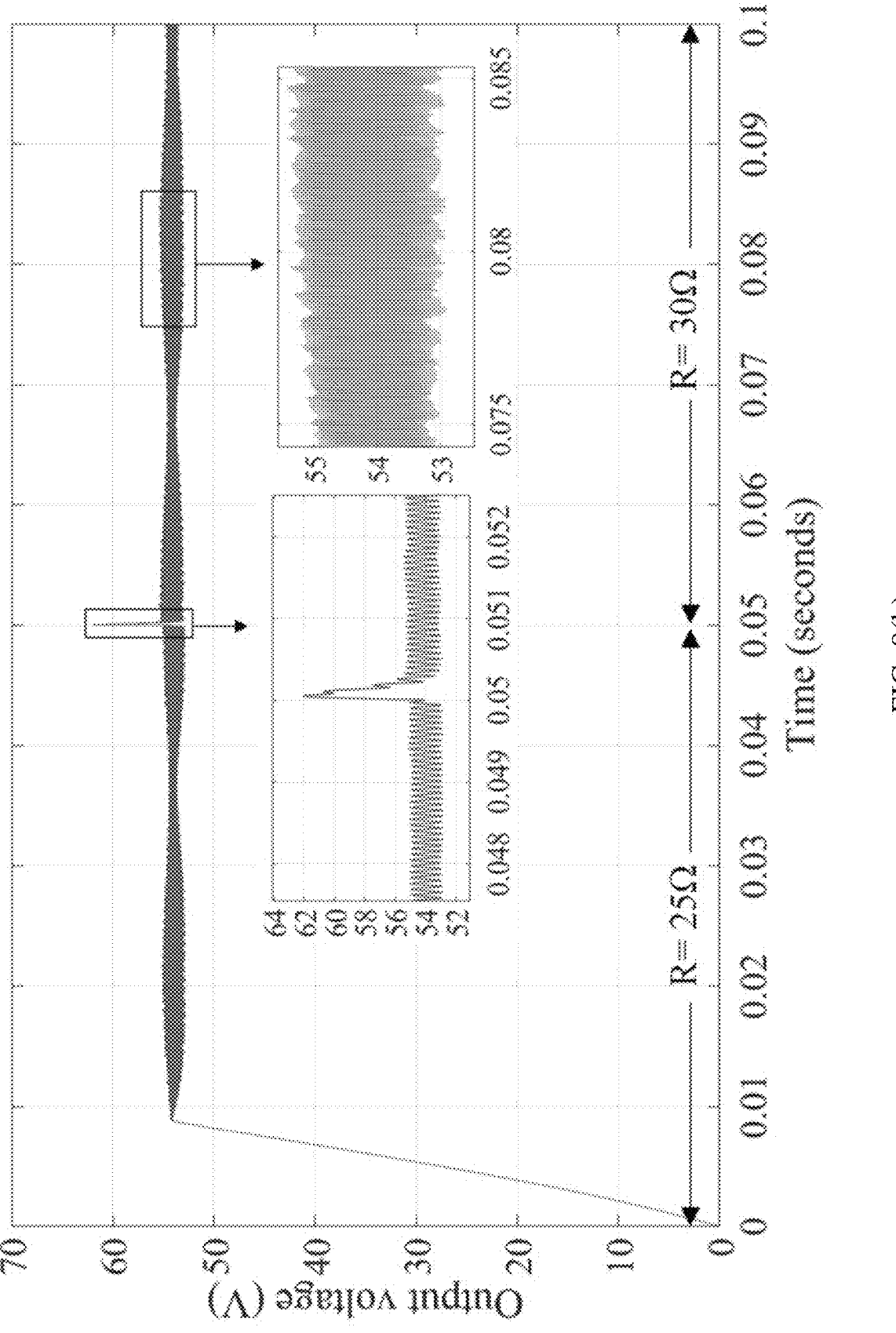
Figure 8C:
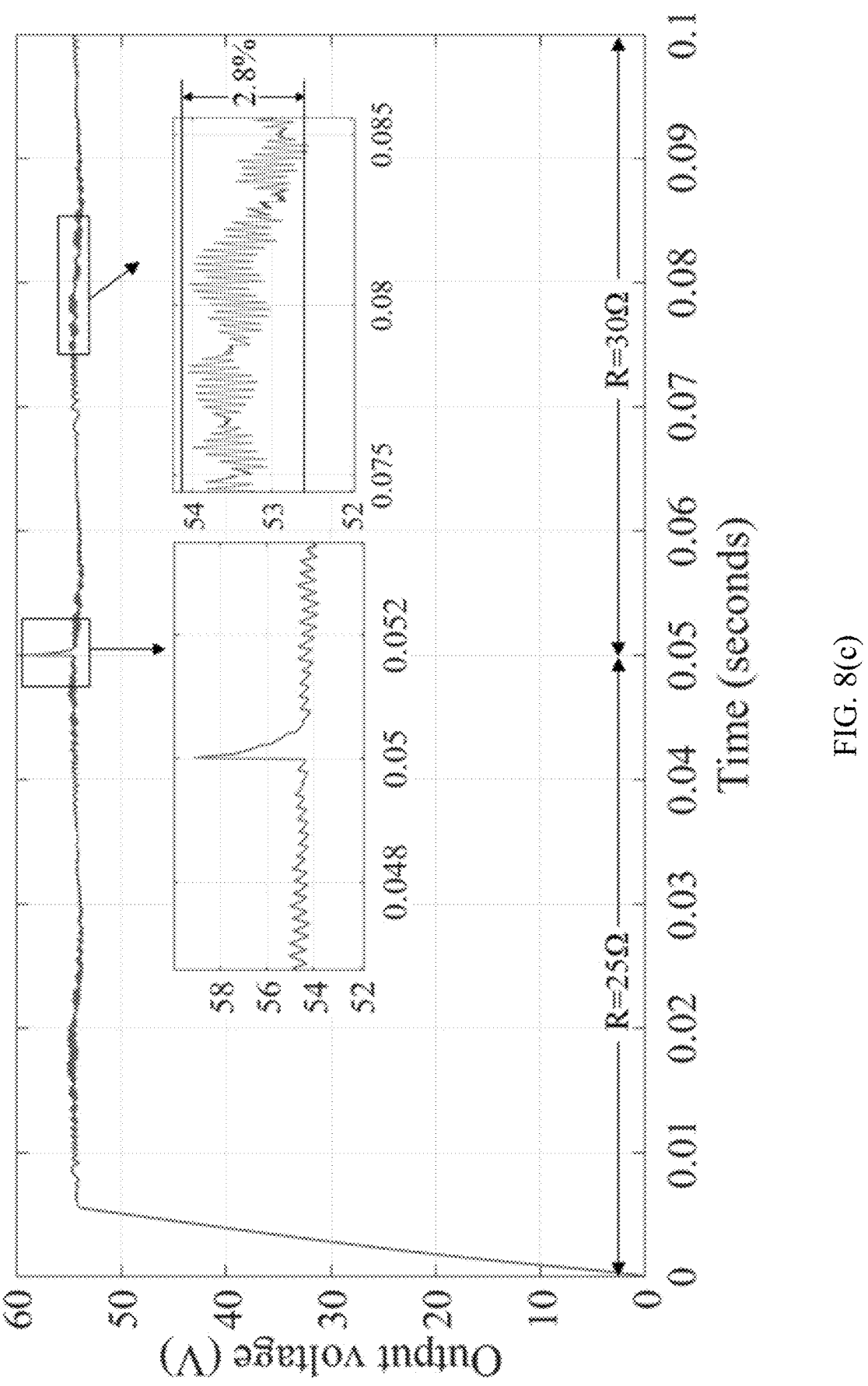

FIG. 8 illustrates the output voltage during the receiver's motion as the load transitions from 25$\Omega$ to 30$\Omega$ at 0.05 seconds. The transient response of the PBITSM controller during load changes is noticeably superior to that of the PI control method and PIPBC control method. The control method of the subject invention is configured to exhibit lower overshoot and achieve faster convergence to the reference value. Notably, the voltage fluctuation under the control method of the subject invention remains limited within 3.3% under both load conditions, whereas the voltage fluctuation under the PI control method increases from 8.9% at 25$\Omega$ to 12.9% at 30$\Omega$. The PIPBC control method experienced a larger overshoot compared to the PBITSM control strategy, and the voltage fluctuation rate under the PIPBC control method increased from 4.4% to 4.6% as the load changes from 25$\Omega$ to 30$\Omega$.

Figure 9A:
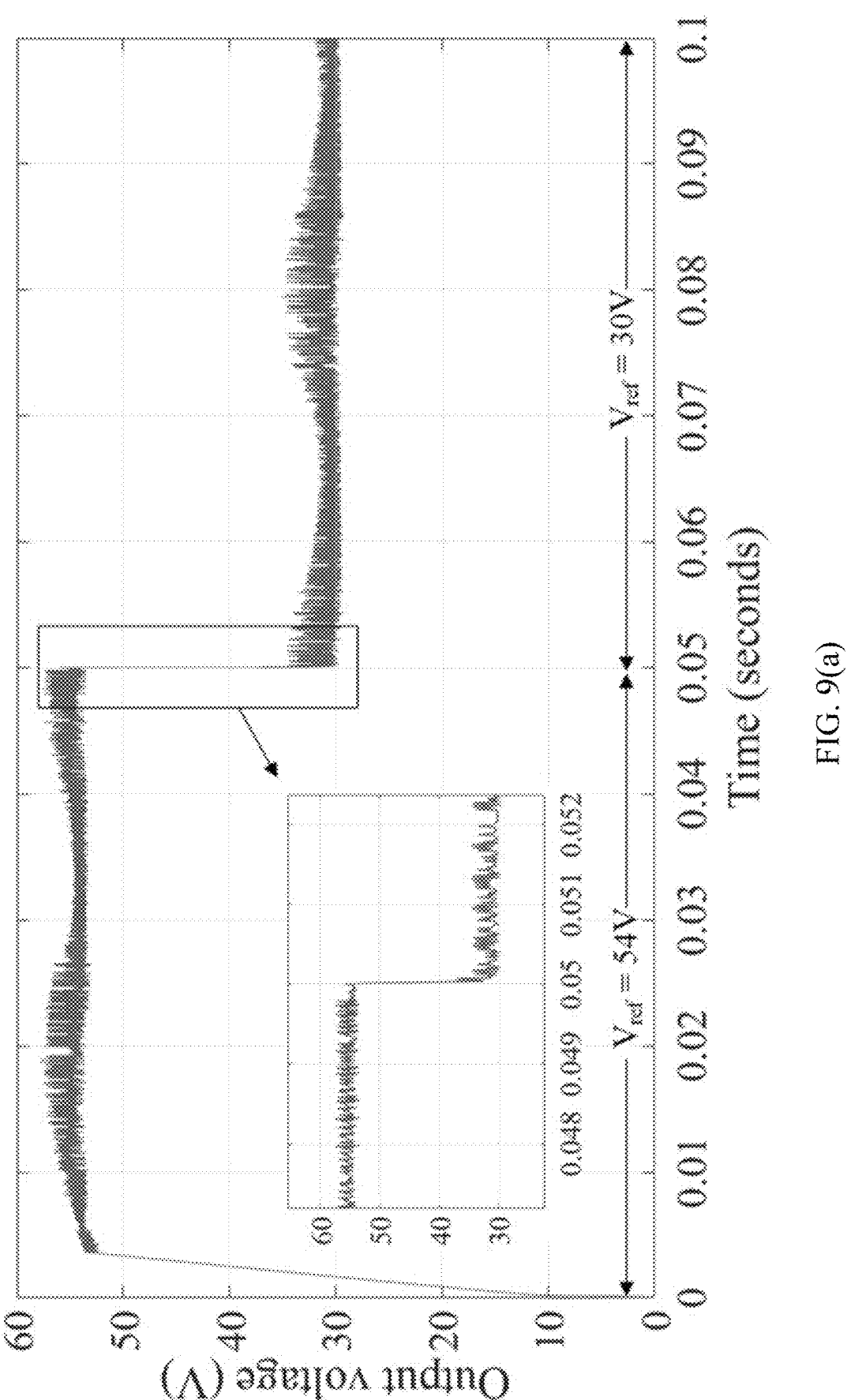
FIGS. 9(a)-9(c) are plot diagrams showing the output voltage of the DWC system during receiver motion at a speed of 50 km/h and the voltage reference changing from 54V to 30V at 0.05 seconds, according to an embodiment of the subject invention.
Figure 9B:
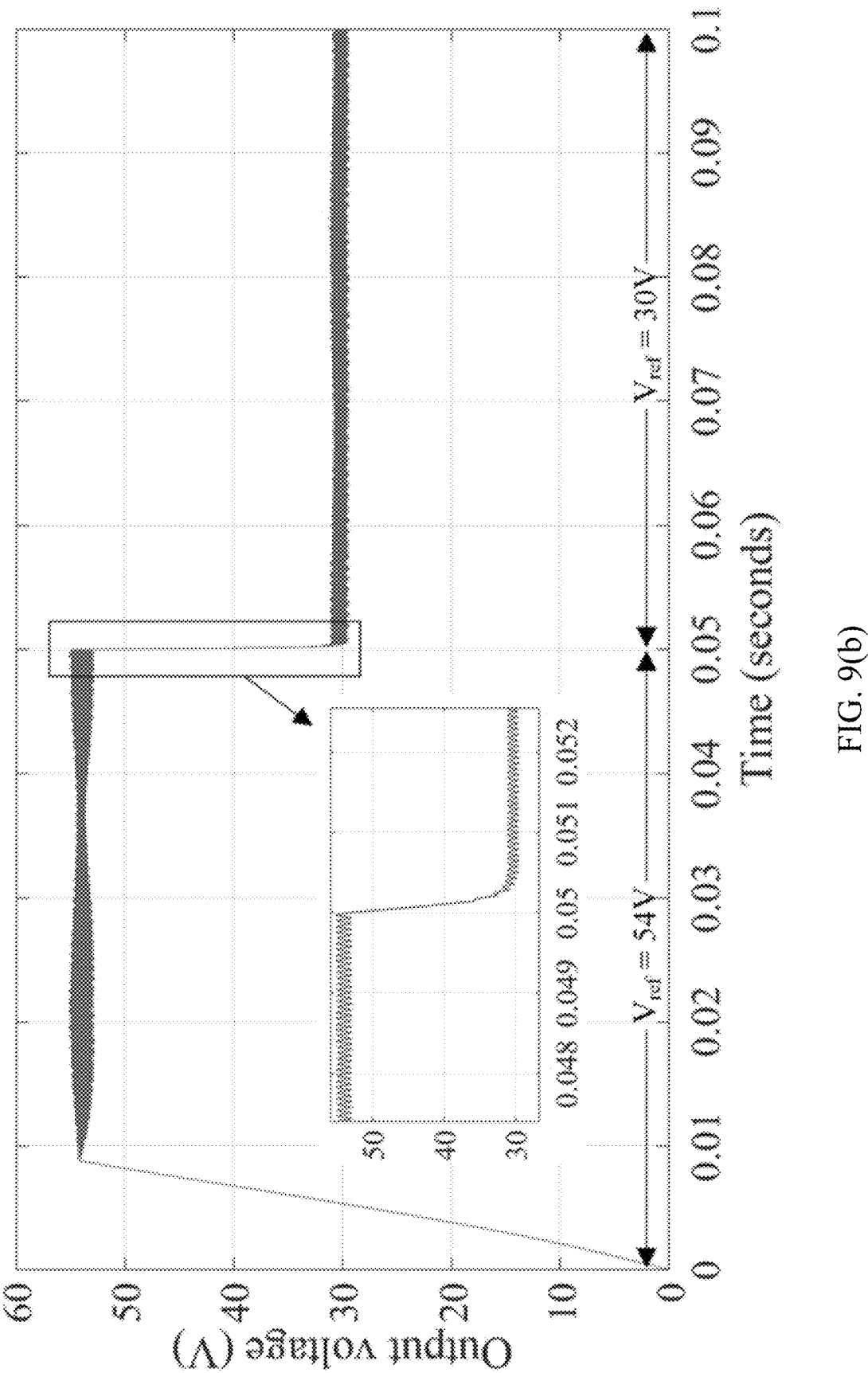
Figure 9C:
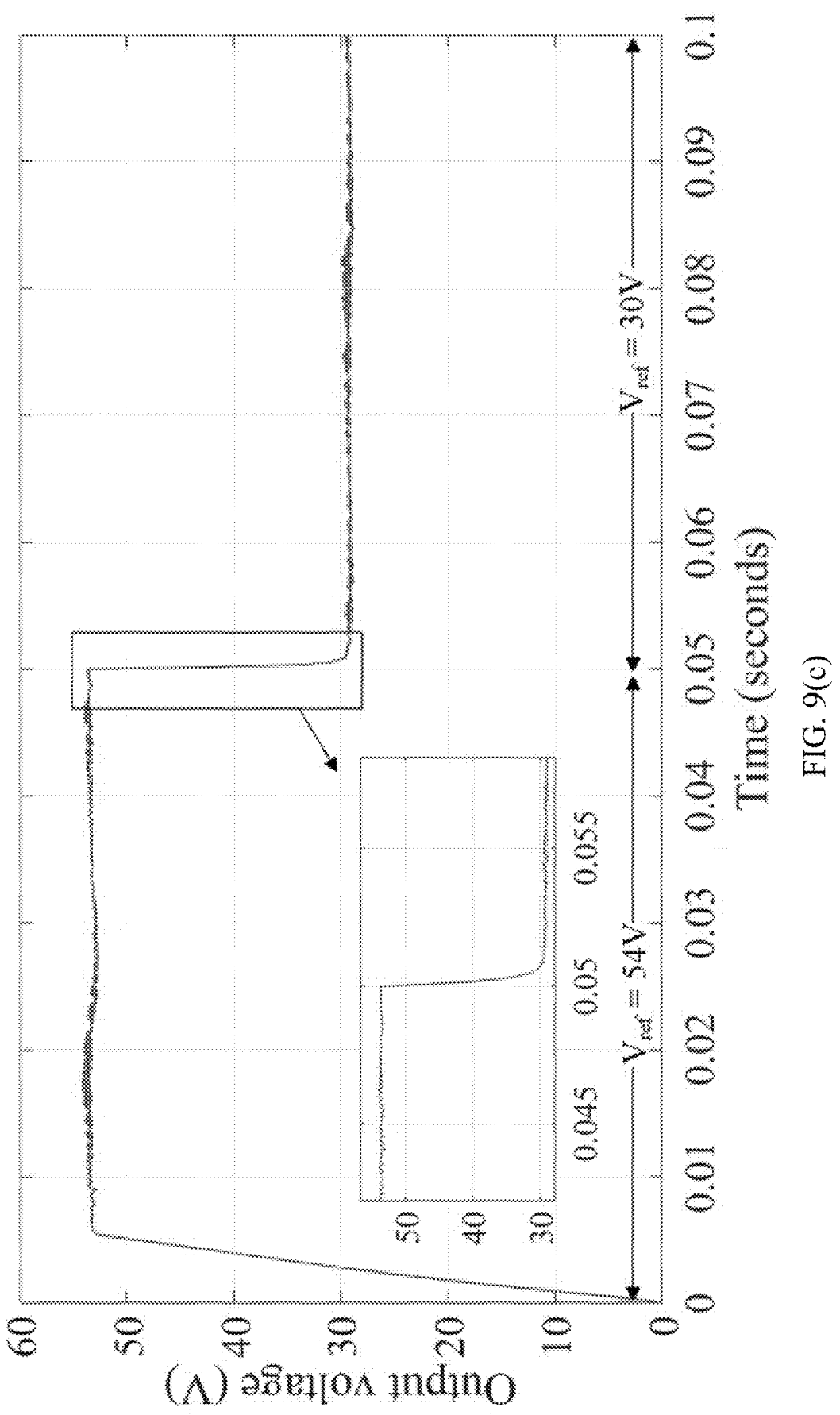

FIG. 9 illustrates the output voltage during the receiver's motion, with the voltage reference transitioning from 54V to 30V. The graph clearly depicts the effectiveness of the control method in swiftly and smoothly responding to the dynamic change in reference value.

In contrast, employing the PI control method and PIPBC control method result in substantial fluctuations in the output voltage when tracking the new reference value (30V). It is noted that the fluctuation rate at both reference values is the same under the operation of the PBITSM control method. These results underscore the superior performance of the control method of the subject invention in stabilizing the output voltage compared to the conventional PI and PIPBC control methods, particularly under varying coupling coefficients and simultaneous changes in load or reference values.

Figure 10A:
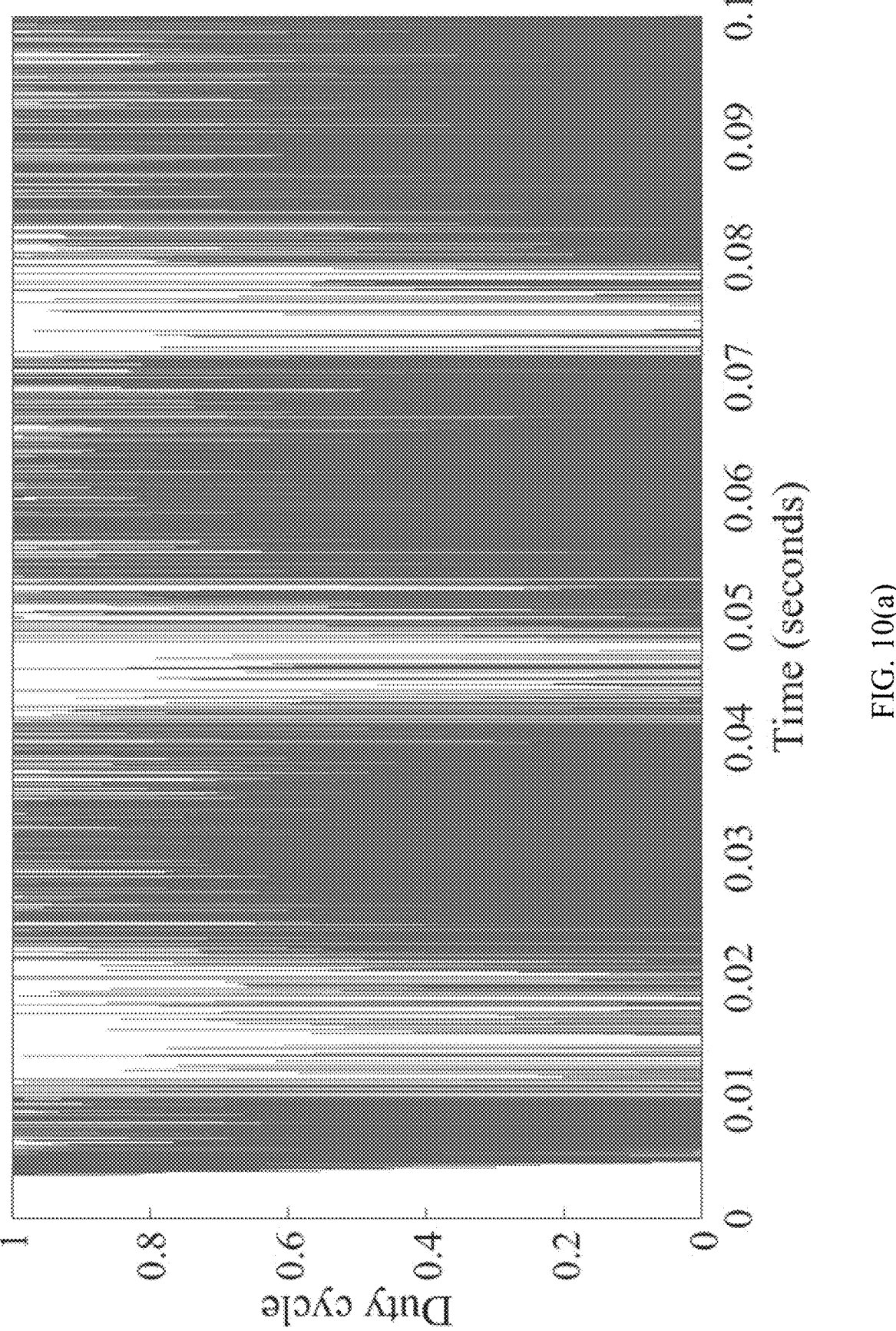
FIGS. 10(a)-10(c) are plot diagrams showing the duty cycle of PI and PBITSM controller during receiver motion at a speed of 50 km/h speed, according to an embodiment of the subject invention.
Figure 10B:
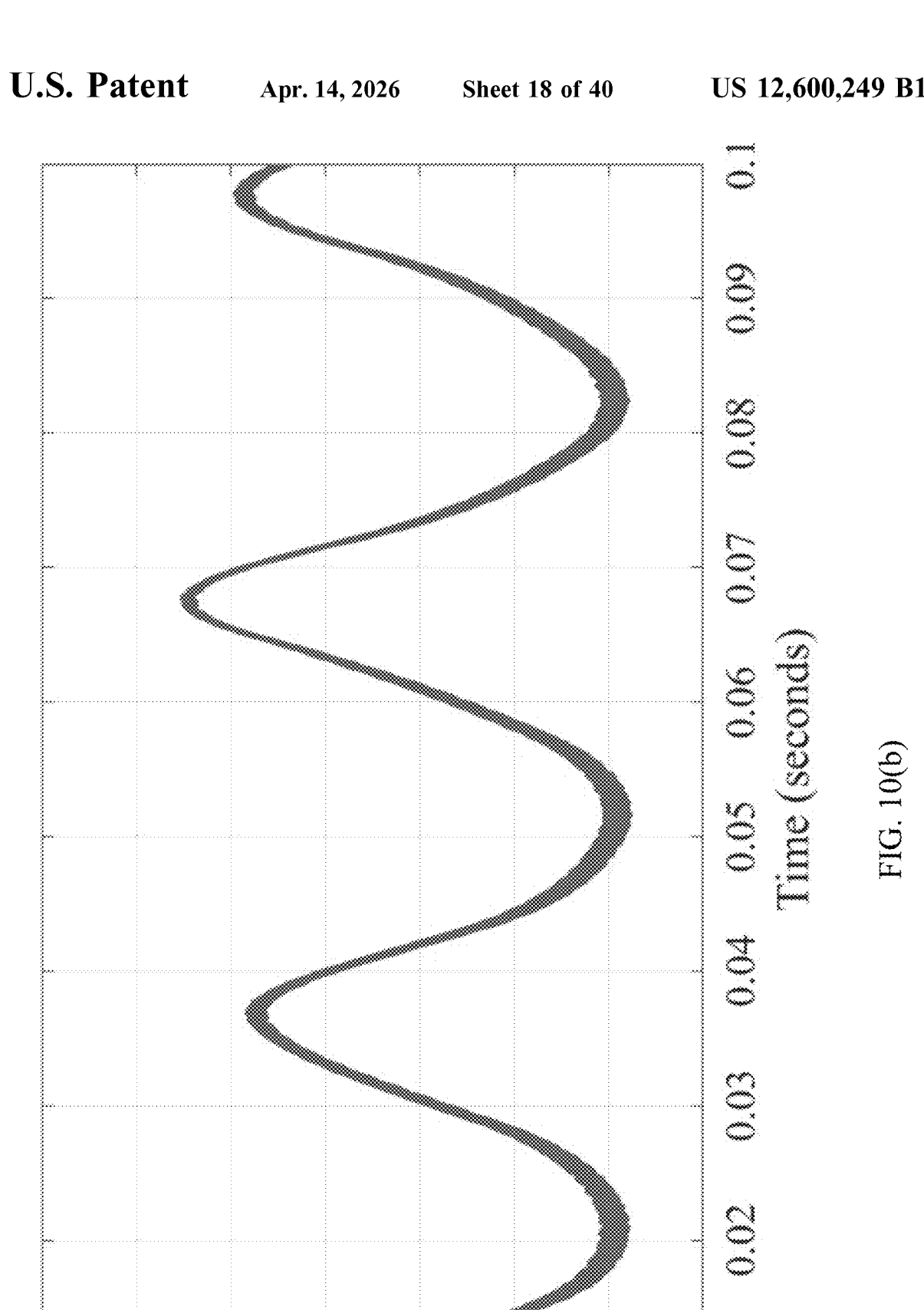
Figure 10C:
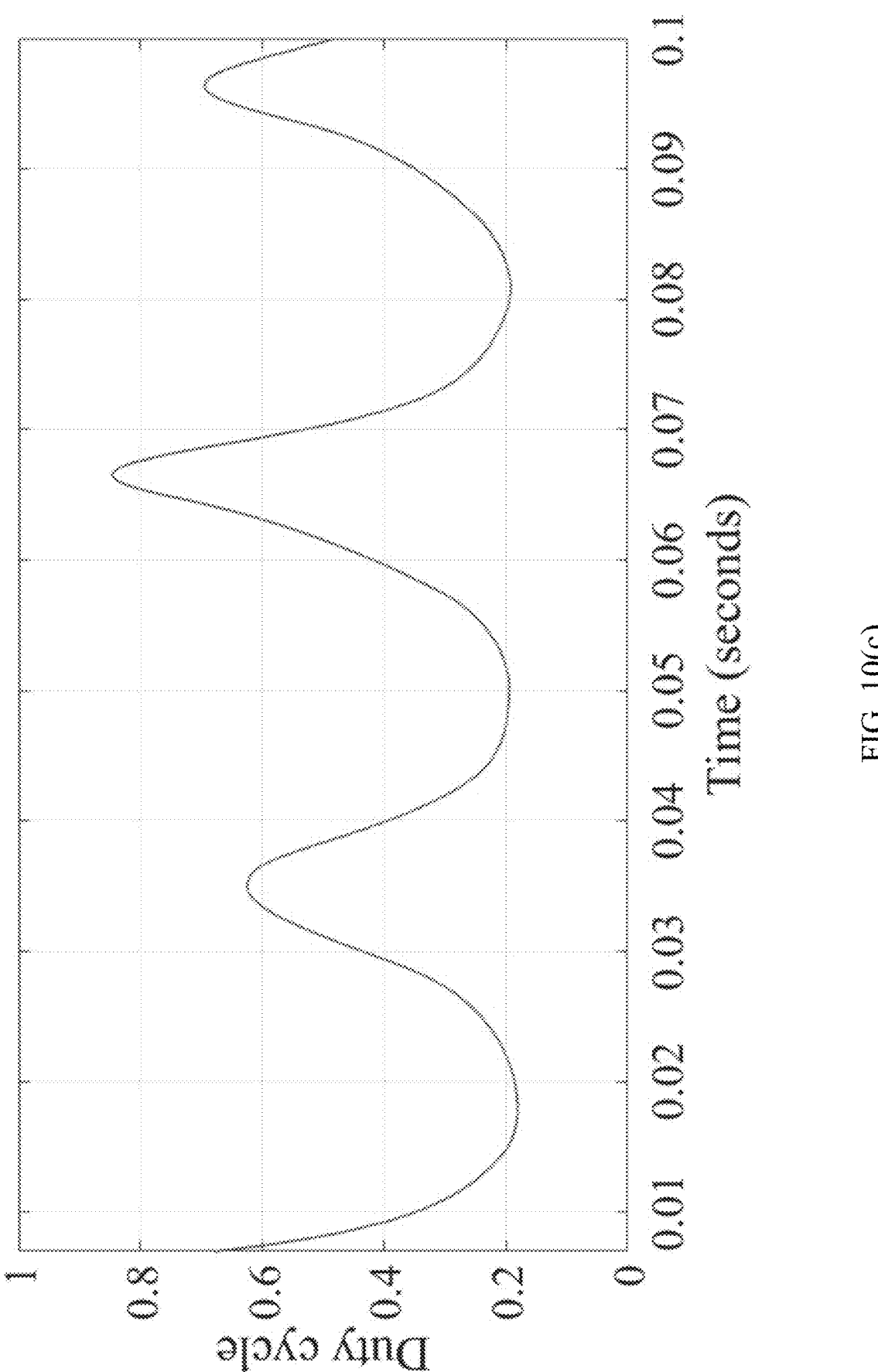

FIG. 10 shows the duty cycle waveforms for the PI, PIPBC and the PBITSM control schemes.

Experimental Results

Figure 11:
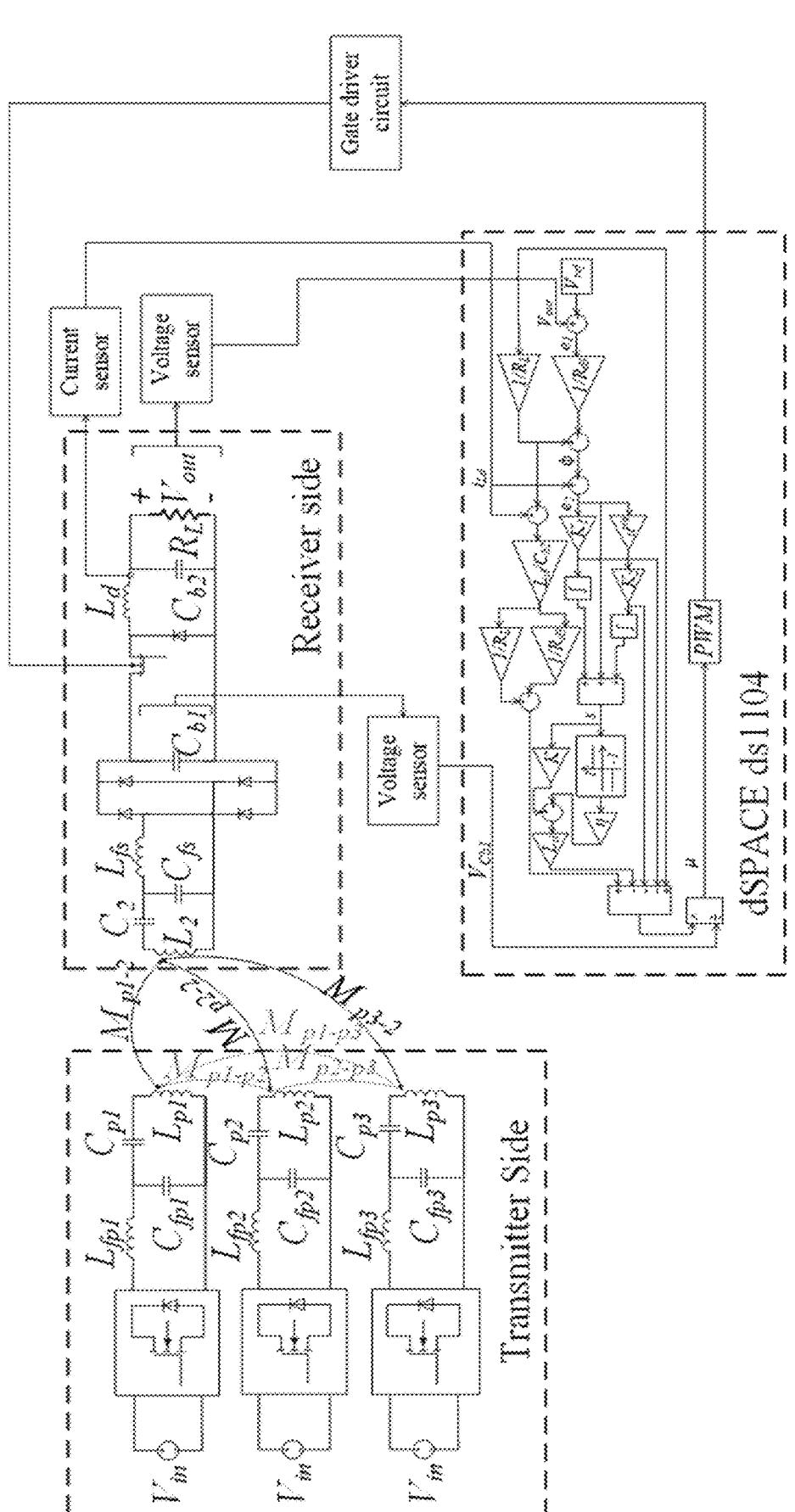
FIG. 11 is a schematic representation showing the hardware block diagram of the DWC system with deploying the PBITSM controller, according to an embodiment of the subject invention.

A prototype of the DWC system, whose hardware block diagram is shown in FIG. 11, was constructed to validate the effectiveness of the PBITSM control method in stabilizing the output voltage.

The primary side comprises four unipolar coils, each driven by an inverter operating at 85 kHz. These four single-phase full-bridge inverters utilize silicon-carbide (SiC) MOSFETs (C2M0025120D).

Additionally, an LCC compensation network is deployed on both the primary and secondary sides. The receiver coil utilizes a unipolar structure mounted on a Computer Numerical Control (CNC) layout, with a stepper motor controlled by a Raspberry Pi to emulate the movement of an electric vehicle.

It is noted that due to hardware limitations, the speed of the receiver in the experiments is restricted to 5.4 km/h. The secondary side circuit comprises an LCC compensation network, a rectifier, and a buck converter equipped with two voltage sensors and a current sensor. The buck converter is controlled by the PBITSM control method, which is implemented based on dSPACE ds1104 controller with a sampling frequency of 20 kHz. The waveforms of the DWC system are acquired and processed by dSPACE ControlDesk software.

Figure 12:
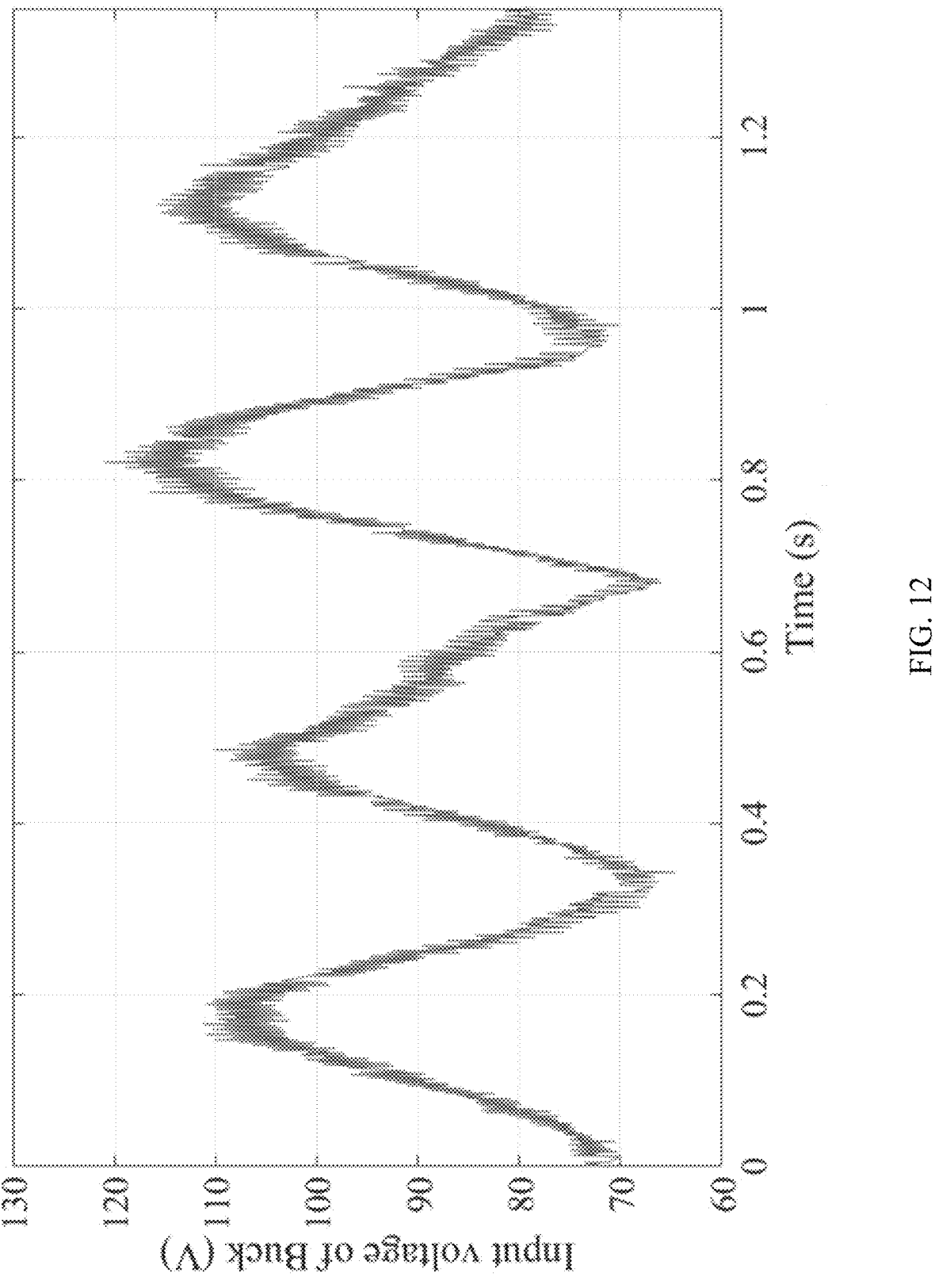
FIG. 12 is a plot diagram showing the input voltage of the buck converter as the receiver travels across transmitter coils, according to an embodiment of the subject invention.

FIG. 12 shows the input voltage of the DWC system as the receiver moves across transmitter coils. This figure demonstrates the fluctuation in the input voltage of the buck converter due to mutual coupling variation. Since there are four transmitter coils in the experiments, the input voltage of the buck converter has four peaks. The input voltage of the buck converter reaches its peak when the receiver aligns with each transmitter coil and decreases to its minimum as the receiver moves into the area between adjacent transmitter coils. It is noted that in the LCC-LCC DWC system, the output voltage of the rectifier (input voltage of the buck converter) is proportional to the mutual coupling between the transmitter and receiver.

Figure 13:
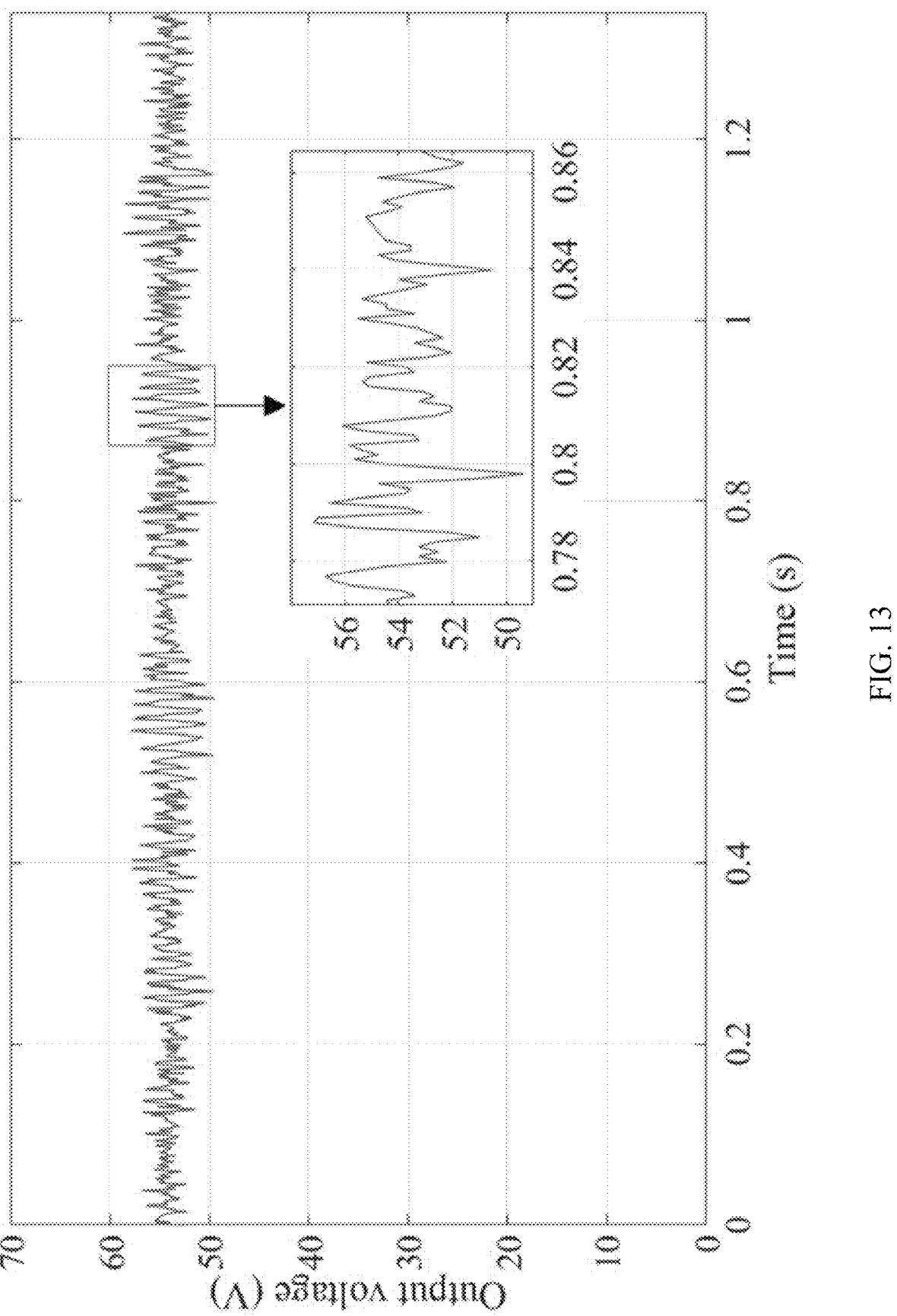
FIG. 13 is a plot diagram showing the output voltage of DWC system as receiver is moving and PI controller is deployed, according to an embodiment of the subject invention.

FIG. 13 illustrates the output voltage of the DWC system when the PI control method is deployed, when the receiver moves across transmitter coils. It is evident that the fluctuation rate of the output voltage of the DWC system with the conventional PI control method deployed is ±8.1%. It is noted that the parameters of the PI control method are selected when $K_p=0.01$ and $K_1=10$.

Figure 14:
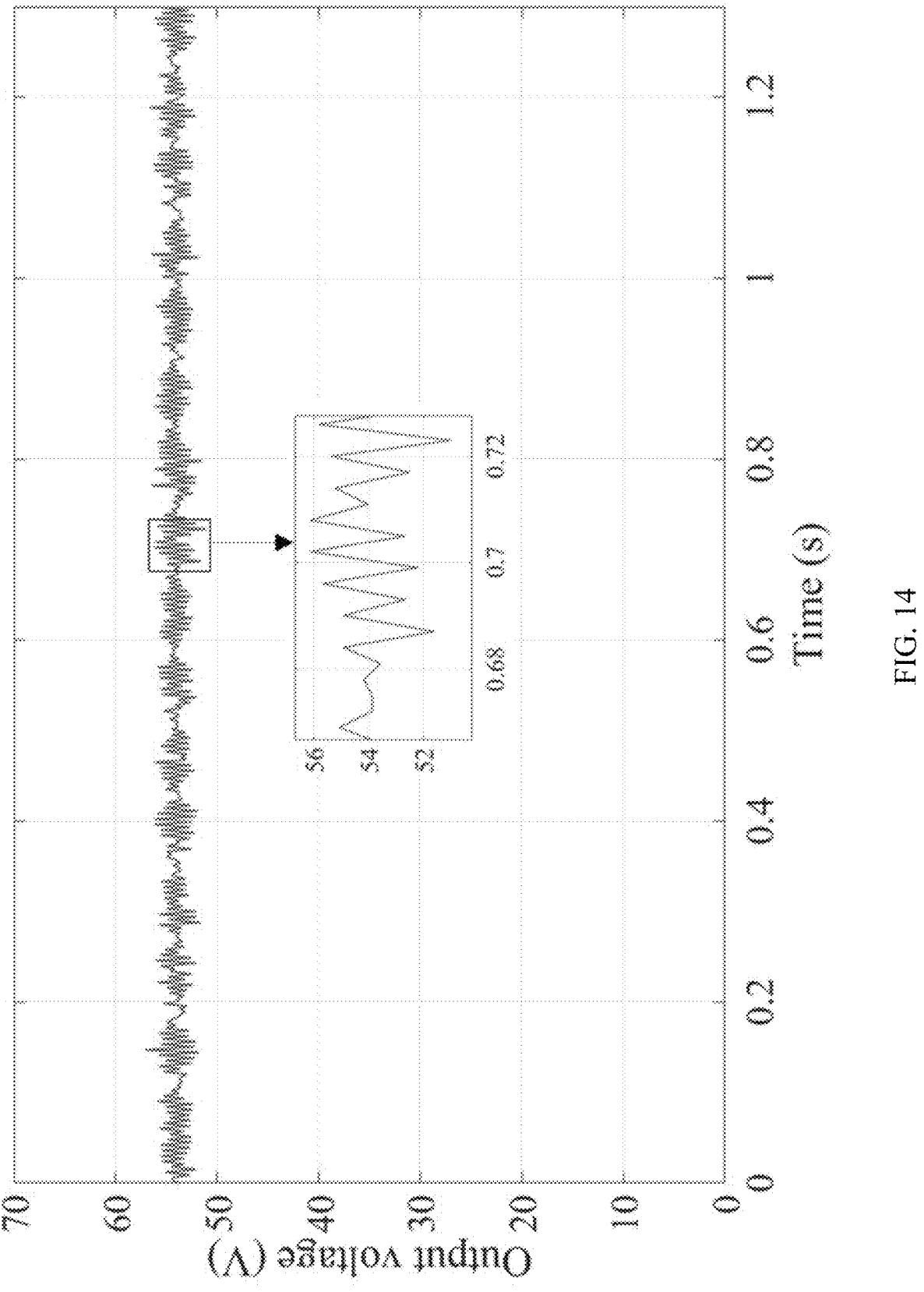
FIG. 14 is a plot diagram showing the output voltage of DWC system as receiver is moving and PIPBC controller is deployed, according to an embodiment of the subject invention.

FIG. 14 demonstrates the output voltages of the DWC system when the conventional passivity-based proportional-integral control (PIPBC) method is implemented. The output voltage fluctuation rate with the deployment of the PIPBC controller is ±4.7%.

Figure 15:
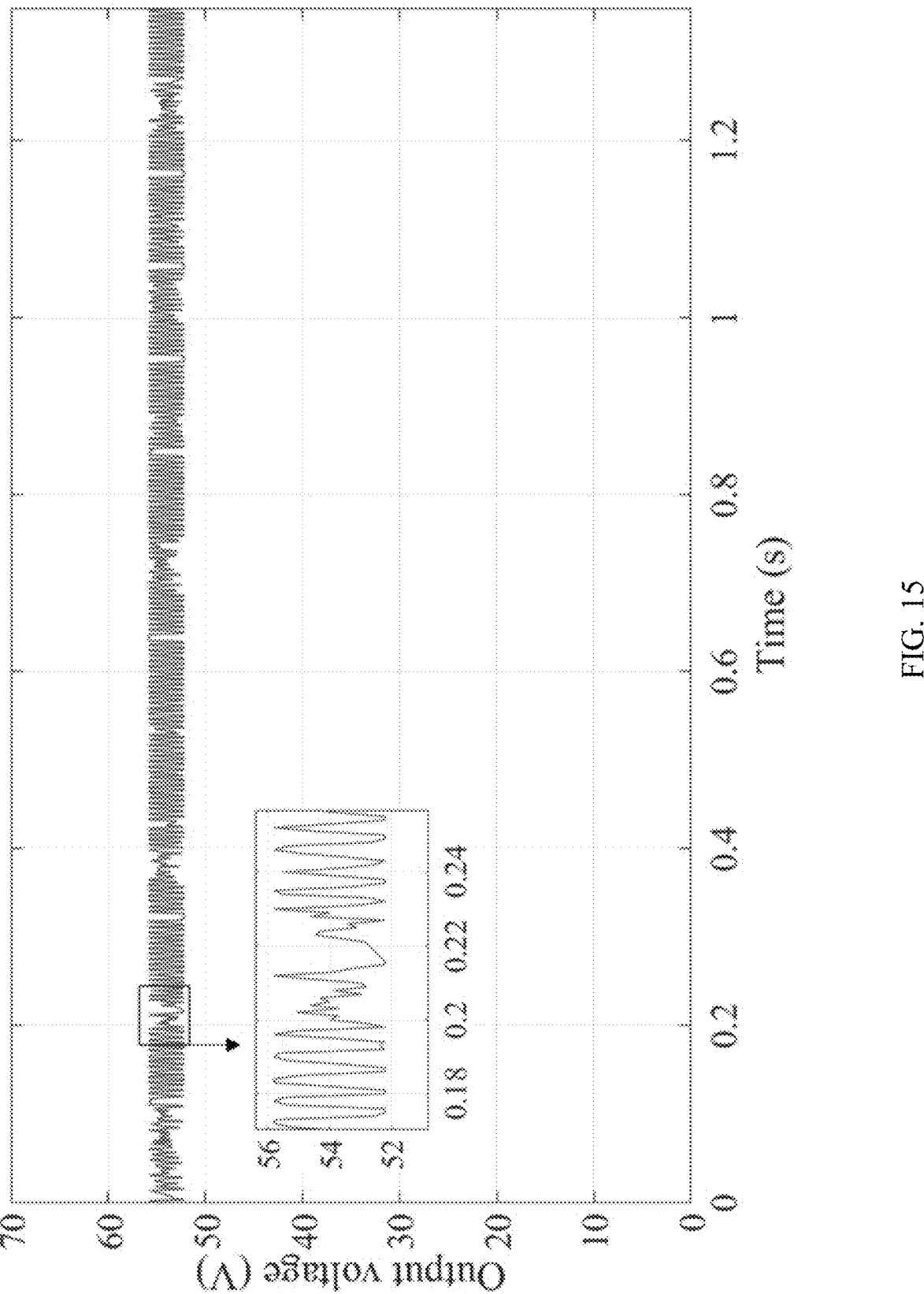
FIG. 15 is a plot diagram showing the output voltage of the DWC system when the controller is deployed while the receiver is in motion, according to an embodiment of the subject invention.

FIG. 15 shows the output voltage of the DWC system when the PBITSM control method is configured, and the receiver is in motion. The fluctuation rate in output voltage is ±3.3%, which is smaller than that of the conventional PI and PIPBC control methods, demonstrating the superiority of the PBITSM control method in suppressing output voltage fluctuations.

Figure 16:
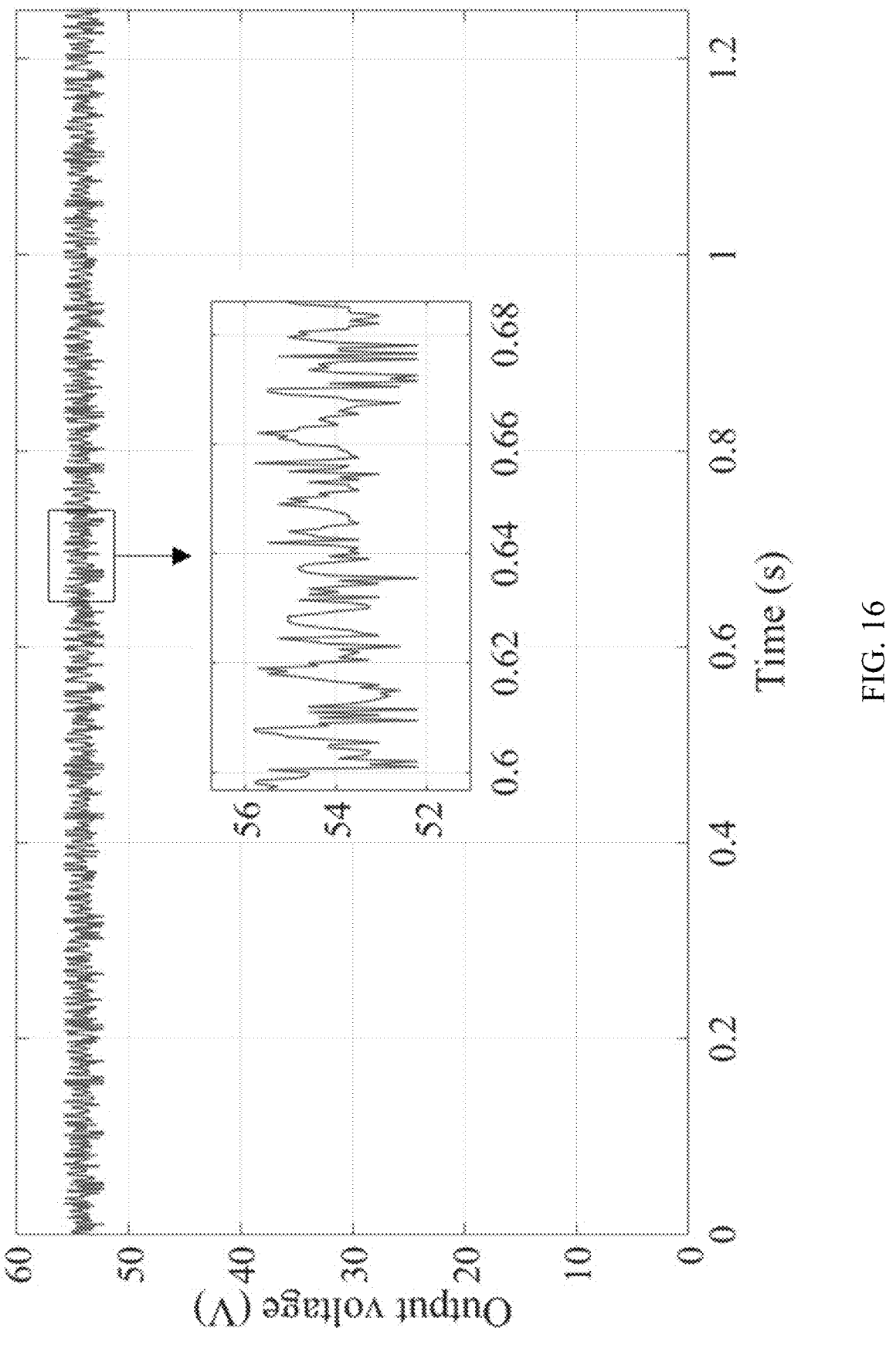
FIG. 16 is a plot diagram showing the output voltage of the DWC system when the controller is deployed while the receiver is in motion with different load condition ($R_L$=30), according to an embodiment of the subject invention.

FIG. 16 illustrates the output voltage of the DWC system during receiver motion under different load condition ($R_L=30$) to demonstrate the effectiveness of the PBITSM control scheme. The figure shows that the output voltage fluctuation remains within 3.3%, highlighting that the load condition has no significant impact on the performance of the PBITSM control scheme.

Figure 17:
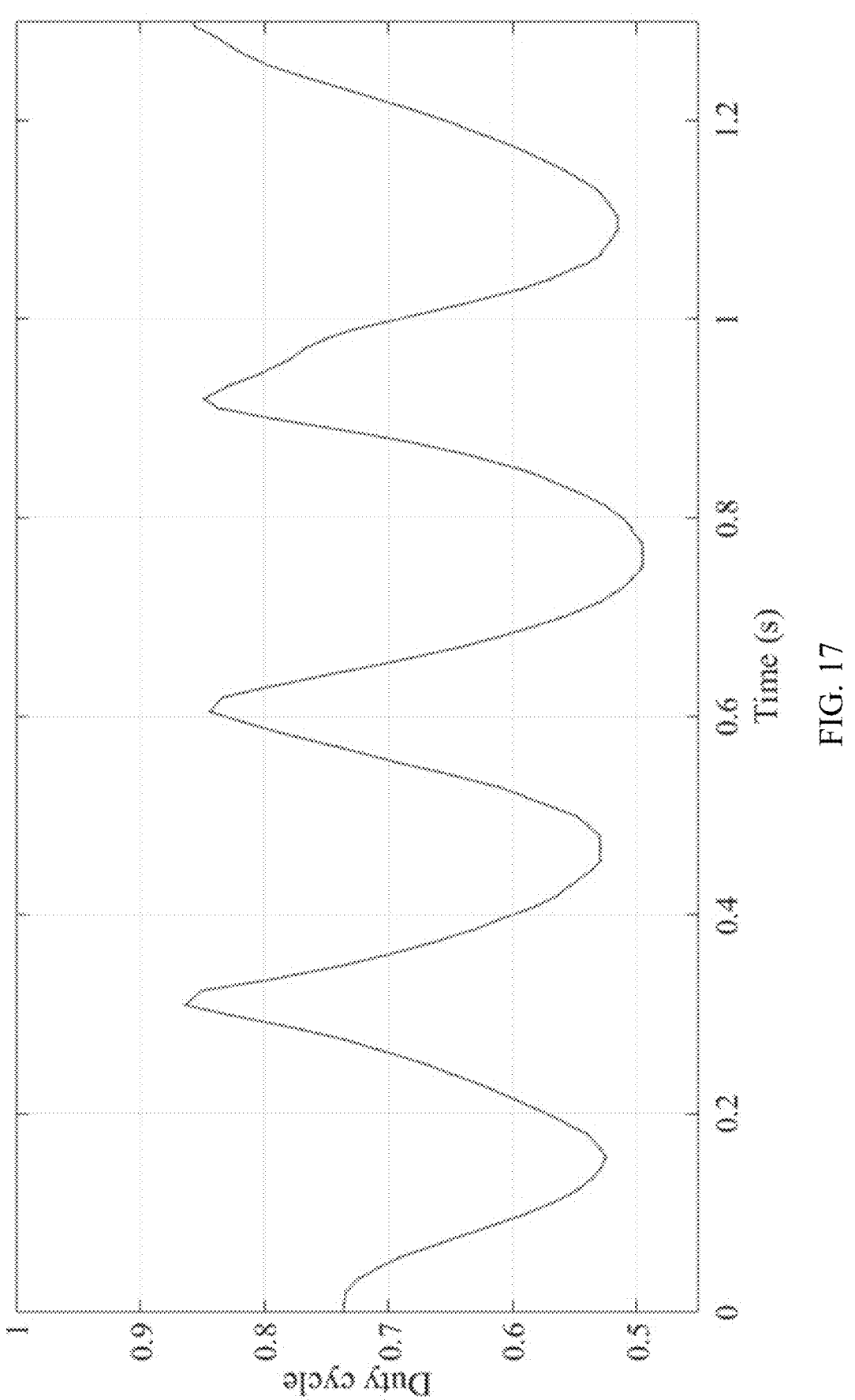
FIG. 17 is a plot diagram showing the duty cycle waveform of the PBITSM controller for regulating the output voltage while the receiver is in motion, according to an embodiment of the subject invention.

FIG. 17 shows the duty cycle waveforms of the PBITSM controller for regulating the output voltage of the DWC system when receiver is in motion.

Figure 18:
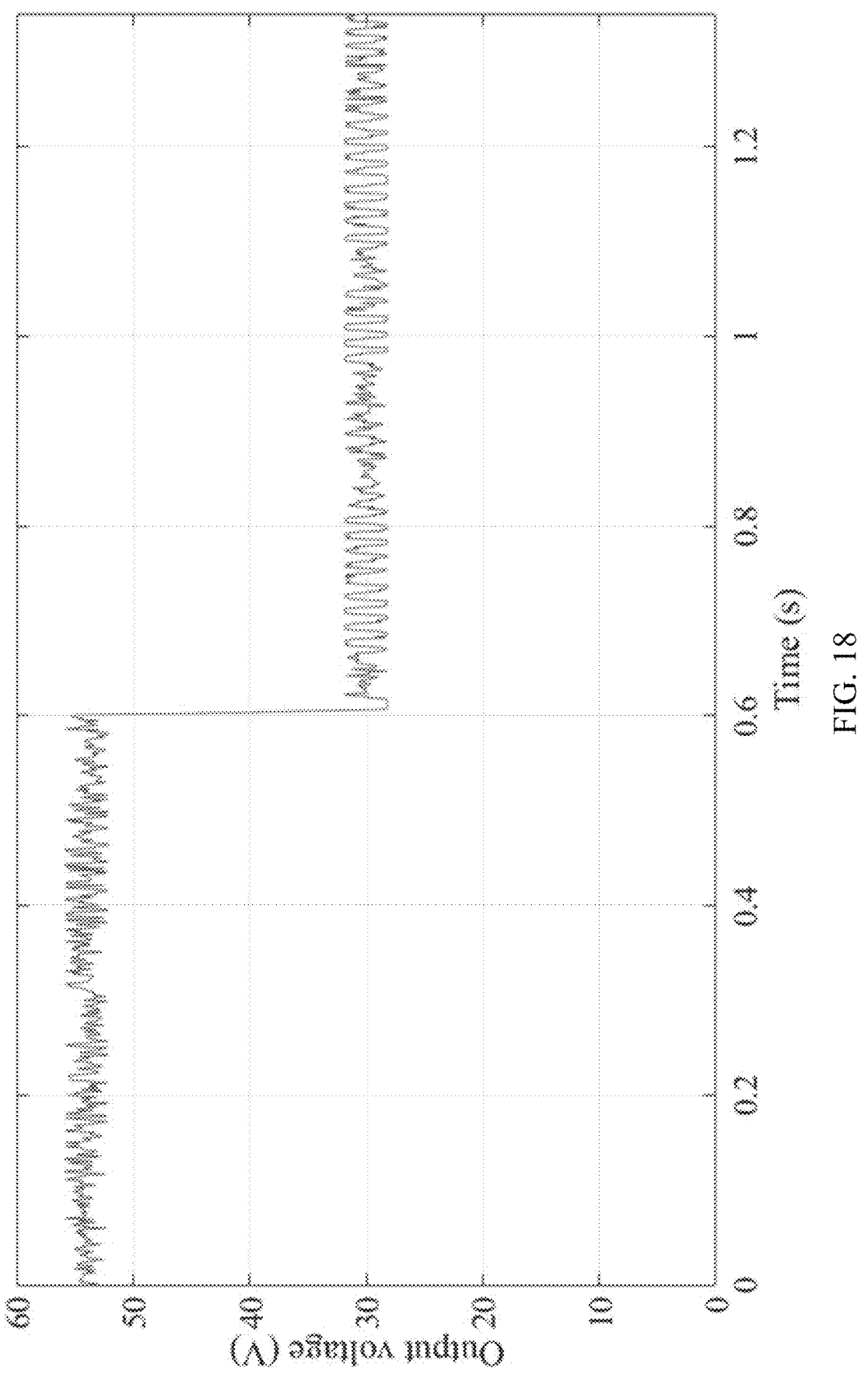
FIG. 18 is a plot diagram showing the output voltage of the DWC system when the reference value changes from 54V to 30V while receiver is moving, according to an embodiment of the subject invention.

FIG. 18 displays the output voltage of the DWC system as the receiver is in motion, with the reference value changing from 54V to 30V. The response of the PBITSM control scheme to the change in output voltage reference is smooth, fast, and without overshoot, highlighting its robustness. It is evident that even when the reference value for output voltage changes, the fluctuation rate of the output voltage remains constrained within ±3.3%, indicating minimal impact on the output voltage fluctuation.

Figure 19:
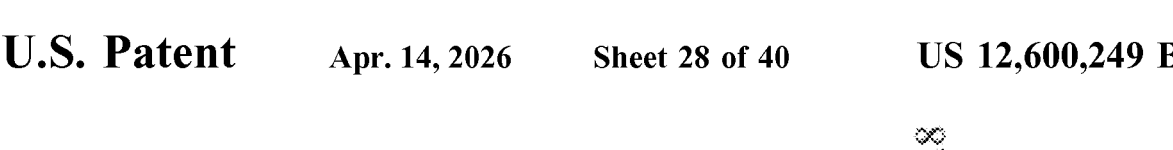
FIG. 19 is a plot diagram showing the efficiency of the DWC system with the PBITSM controller at various positions, according to an embodiment of the subject invention.

FIG. 19 illustrates the efficiency of the DWC system with the PBITSM control scheme at various positions. The maximum efficiency reaches 78.29%, while the minimum efficiency is 74.05%, indicating a 5.57% fluctuation.

The table in FIG. 30 presents a comprehensive comparison between the control method of the subject invention and various conventional secondary side control strategies aimed at suppressing output voltage fluctuations, as documented in the literature.

A conventional secondary controller was developed by integrating a buck DC-DC converter on the secondary side. This controller is regulated using passivity-based Proportional-Integral (PI) control, tailored to stabilize the output voltage amidst coupling variations during vehicle movement. The secondary side of the DWC system incorporates a three-level buck converter controlled by a frequency-domain PI-based composite control method. This controller limits the out-put voltage fluctuation rate to 4.4%. However, both approaches rely on PI control algorithms, which may lack the agility needed to effectively address the extensive and rapidly changing conditions of DWC systems. Additionally, the use of a PI controller contributes to increased costs. A conventional model predictive control method is introduced to facilitate rapid regulation, particularly in response to swift variations in the coupling coefficient observed in high-speed vehicles. This approach employs model predictive control to regulate a back-end buck converter, showcasing superior performance compared to conventional methods due to its effective dynamic tracking capabilities. However, the mathematical model used is incompatible with that of the electric vehicle (EV) battery, limiting the sustainability of constant power over time. A constant resistance control method was employed to regulate the output voltage of the DWC system, limiting the fluctuation rate to 3.19%. In addition to deploying the controller, the coil structure is also optimized to further reduce the fluctuation rate. However, this control strategy may not be effective for any coil structure.

The previous studies discussed above lack finite-time stability, which is essential for enhancing disturbance rejection capabilities and ensuring faster convergence.

In contrast, the PBITSM control method of the subject invention demonstrates significant effectiveness in reducing output voltage fluctuations during electric vehicle movement. It exhibits finite-time stability, resulting in superior disturbance rejection and faster convergence compared to other control schemes documented in the literature. Moreover, its robust performance is evident in maintaining a stable output voltage, even in the presence of reference changes and coupling fluctuations, effectively limiting the fluctuation rate to 3.3%.

The passivity-based integral terminal sliding mode (PBITSM) control method of the subject invention is configured for suppressing output voltage fluctuations in DWC systems subject to mutual coupling variation due to vehicle movement. The PBITSM control scheme has finite-time stability, offering advantages such as fast convergence, better disturbance rejection capability, and robustness in the face of mutual coupling variation. The simulation and experimental results showcase the effectiveness of the PBITSM control method in providing stable output voltage at the battery end of DWC systems with minimal fluctuation, limited to, for example, ±3.3%, as the receiver travels over transmitter coils under different operating conditions.

Example Two

Design Procedure of Control Method and Systems

Figure 20:
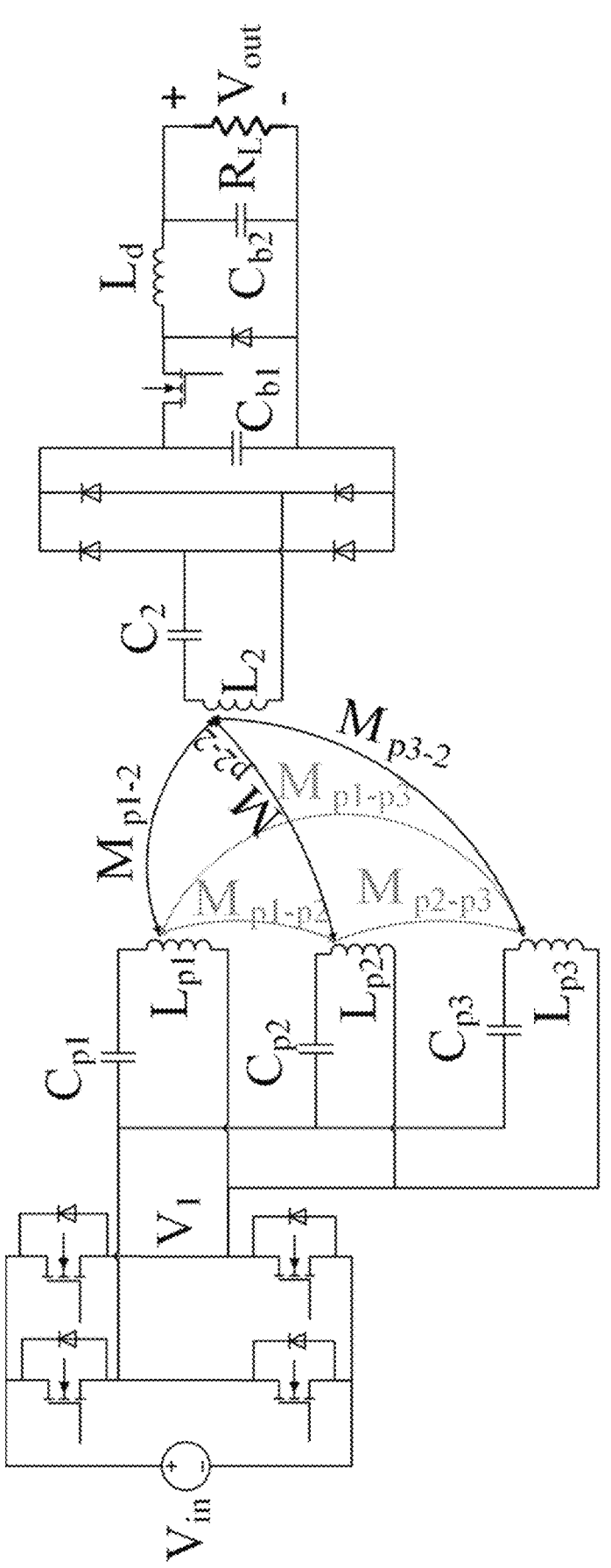
FIG. 20 is a schematic representation showing the circuit topology of the DWC system, according to an embodiment of the subject invention.

FIG. 20 illustrates the circuit topology of the dynamic wireless charging system, incorporating a DC-DC buck converter on the vehicle side of the system. As depicted in FIG. 20, $M_{pj\text{-}2}$ indicates the mutual inductance between the $j^{th}$ transmitter coil $L_{pj}$ and the receiver coil $L_2$. Furthermore, $M_{p1\text{-}p2}$ and $M_{p2\text{-}p3}$ represent the mutual inductance between neighboring transmitter coils. The Series-Series compensation network is employed for the DWC system due to its simplicity. In this configuration, $C_{p1}$, $C_{p2}$, and $C_{p3}$ serve as the primary series compensation network for each transmitter coil, while $C_2$ acts as the secondary series compensation network.

Figure 21:
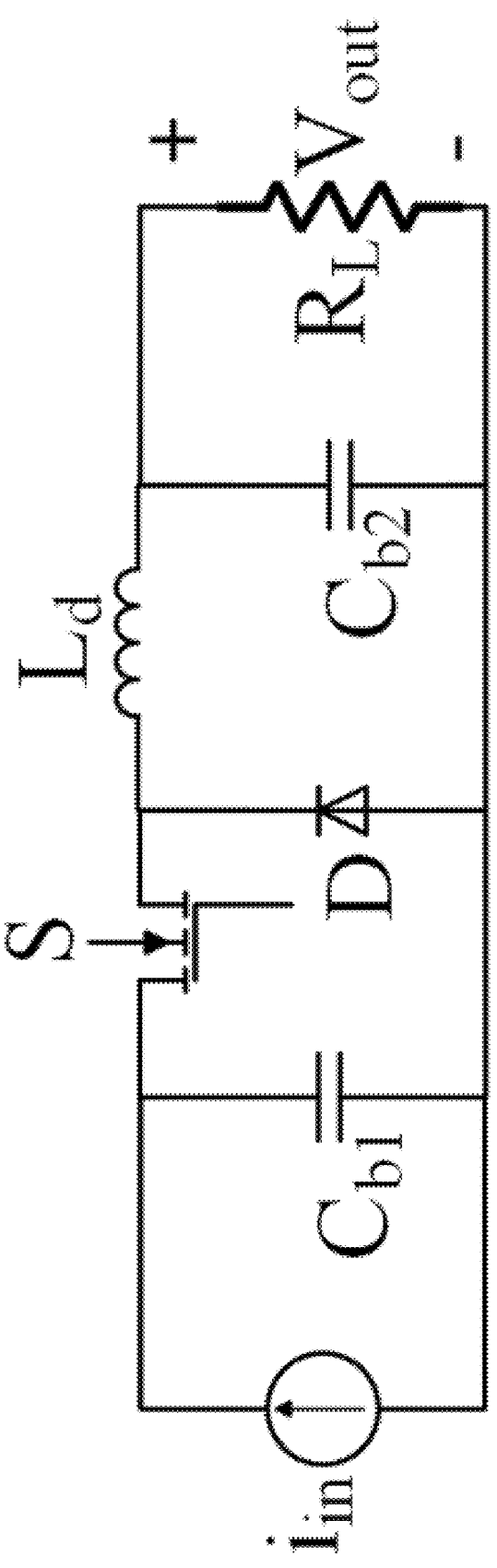
FIG. 21 shows the equivalent circuit topology of the buck converter at the vehicle side, according to an embodiment of the subject invention.

Since the double-sided series compensation network exhibits characteristics of a current source, the IPT system, serving as the input to the DC-DC Buck converter, can be represented as an ideal current source, denoted as ii, and illustrated in FIG. 21.

The $i_{in}$ can be expressed as follows:

$$i_{in}(t) = \frac{\pi V_{in}}{2\omega \sum_{i=1}^{3} M_{pi,2}} |\sin(\omega t)| \tag{32}$$

The equations for average state model of the buck converter are as follows:

$$L_d \frac{di_{L_d}}{dt} = \mu V_{Cb1} - V_{out} \tag{33}$$

$$C_{b1} \frac{dV_{Cb1}}{dt} = i_{in} - \mu i_{L_d}$$

$$C_{b2} \frac{dV_{out}}{dt} = i_{L_d} - \frac{V_{out}}{R_L}$$

First the error is defined as follows:

$$e_1 = V_{out} - V_{out}^* \tag{34}$$

The passivity-based control method is constructed based on the Eulerâ Lagrange (EL) representation, which can be written as follows:

$$M\dot{x} + (J + R(x))x = G\mu + d \tag{35}$$

where $x \in \mathbb{R}^n$ is the state vector, $\mu \in \mathbb{R}^m$ (where m<n) is the control action, and M>0 is the generalized inertia. The $J(x)=-J^T(x)$ and $R(x)=R^T(x)>0$ are defined as the natural interconnection and damping matrices, respectively. The state vector is defined as $x=[i_{L_d}, V_{Cb1}, V_{out}]^T$, and the stored energy can be expressed as follows:

$$H = \frac{1}{2}x^T Mx = \frac{1}{2}L_d i_{L_d}^2 + \frac{1}{2}C_{b1}V_{Cb1}^2 + \frac{1}{2}C_{b2}V_{out}^2 \tag{36}$$

The matrices M, J, R(x), G and d are expressed as follows:

$$M = \begin{bmatrix} L_d & 0 & 0 \\ 0 & C_{b1} & 0 \\ 0 & 0 & C_{b2} \end{bmatrix}, J = \begin{bmatrix} 0 & 0 & 1 \\ 0 & 0 & 0 \\ -1 & 0 & 0 \end{bmatrix}$$

$$R(x) = \begin{bmatrix} 0 & 0 & 0 \\ 0 & 0 & 0 \\ 0 & 0 & \frac{1}{R_L} \end{bmatrix}, G = \begin{bmatrix} V_{Cb1} \\ -i_{L_d} \\ 0 \end{bmatrix}, d = \begin{bmatrix} 0 \\ i_{in} \\ 0 \end{bmatrix}$$

The passivity-based control method employs a two-stage approach to effectively mitigate energy oscillations in inductors and capacitors. This is achieved by integrating damping gains into the control strategy, contributing to enhanced stability and performance. These two stages are known as the energy shaping stage and the damping injection stage. For the energy shaping stage, we rewrite the state vectors as $x=x_d+\tilde{x}$, where $x_d$ is the desired value ($x_d$ [$i_{L_d}^*$, $V_{Cb1}^*$, $V_{out}^*]^T$) and $\tilde{x}$ is deviation from the desired value, and substituting it into Equation (35), we obtain:

$$M\dot{\tilde{x}} + [J + R((x)]\tilde{x} = G\mu + d - (M\dot{x}_d + [J + R(x)]x_d) \tag{37}$$

for the damping injection stage, we can rewrite the damping matrix as $R(x)=R_i(x)+R_d$, where $$R_d = \begin{bmatrix} R_{d1} & 0 & 0 \\ 0 & \frac{1}{R_{d2}} & 0 \\ 0 & 0 & \frac{1}{R_{d3}} \end{bmatrix}, R_i = \begin{bmatrix} R_{d1} & 0 & 1 \\ 0 & \frac{1}{R_{d2}} & 0 \\ 0 & 0 & \frac{1}{R_{d3}} - \frac{1}{R_L} \end{bmatrix}$$

Then by substituting $R(x)=R_i(x)+R_d$ into Equation (37), we obtain:

$$M\dot{\tilde{x}} + [J + R_i(x)]\tilde{x} = G\mu + d - (M\dot{x}_d + [J + R(x)]x_d - R_d\tilde{x}) \tag{38}$$

The inclusion of virtual resistances ensures the dissipation of transient energy within the system, aligning with the principles of Lyapunov stability. Consequently, the system achieves complete passivity, leading the left-hand side of Equation (38) to converge to a globally asymptotically stable equilibrium point, denoted as $\tilde{x}\approx0$. This approach establishes a foundation for a stable control design, which can be further pursued by characterizing Equation (38) as follows:

$$G\mu + d - (M\dot{x}_d + [J + R(x)]x_d - R_d\tilde{x}) = 0 \tag{39}$$

Since the reference values are constant, the $\dot{x}_d=0$. Then we can expand the matrix in Equation (39) and extract each row as follows:

$$\begin{cases} V_{Cb1}\mu - V_{out} + R_{d1}(i_{Ld} - i_{Ld}^*) = 0 \\ -i_{Ld}\mu + i_{in} + \dfrac{1}{R_{d2}}(V_{Cb1} - V_{Cb1}^*) = 0 \\ i_{Ld} - \dfrac{1}{R_L}V_{out} + \dfrac{1}{R_{d3}}(V_{out} - V_{out}^*) = 0 \end{cases} \quad (40)$$

The first and second expressions of Equation (40) cannot be selected due to g. Therefore, the third expression can be selected and as $i_{Ld}$ emerging in the equation, an intermediary variable ($\phi$) corresponding to $i_{Ld}$ (that is, $\phi \approx i_{Ld}$) is introduced, which acts as the reference value for inductor current for the integral terminal sliding mode control. Variable $\phi$ can be expressed as follows:

$$\phi = \frac{1}{R_L}V_{out} - \frac{1}{R_{d3}}(V_{out} - V_{out}^*) \quad (41)$$

Now the integral terminal sliding mode control is designed. The terminal integral sliding surface can be defined as follows:

$$s = e_2 + K_1 \int_0^t e_2 dt + K_2 \int_0^t e_2^{\frac{q}{p}} dt \quad (42)$$

where $e_2 = i_{Ld} - \phi$. The derivative of Equation (42) can be expressed as follows:

$$\dot{s} = \dot{e}_2 + K_1 e_2 + K_2 e_2^{p/q} \quad (43)$$

$$\dot{s} = (\dot{i}_{Ld} - \dot{\phi}) + K_1(i_{Ld} - \phi) + K_2(i_{Ld} - \phi) \quad (44)$$

$$\dot{s} = \frac{1}{L_d}(\mu V_{Cb1} - V_{out}) + K_1(i_{Ld} - \phi) + \\ K_2(i_{Ld} - \phi) - \left(\frac{1}{R_L} - \frac{1}{R_{d3}}\right)\frac{1}{C_{b2}}\left(i_{Ld} - \frac{V_{out}}{R_L}\right) \quad (45)$$

Selecting a suitable reaching law that satisfies $\dot{S}S \leq 0$ (that is, the reaching condition) is crucial for determining the control law. To ensure $\dot{S}S \leq 0$, a conventional reaching law can be formulated in the following manner:

$$\dot{s} = -\eta \text{sign}(s) - Ks \quad (46)$$

where $\eta$ and K are positive gains. Combining Equations (45) and (46), we can obtain:

$$-\eta \text{sign}(s) - Ks = \frac{1}{L_d}(\mu V_{Cb1} - V_{out}) + \\ K_1(i_{Ld} - \phi) - \left(\frac{1}{R_L} - \frac{1}{R_{d0}}\right)\frac{1}{C_{b2}}\left(i_{Ld} - \frac{V_{out}}{R_L}\right) + K_2(i_{Ld} - \phi) \quad (47)$$

The duty cycle ($\mu$) can be derived as follows:

$$\mu = \frac{1}{V_{Cb1}}\Big[ L_d(-\eta \text{sign}(s) - Ks - K_1(i_{Ld} - \phi)) + \\ V_{out} + L_d\Big(\Big(\frac{1}{R_L} - \frac{1}{R_{d3}}\Big)\frac{1}{C_{b2}}\Big(i_{Ld} - \frac{V_{out}}{R_L}\Big) - K_2(i_{Ld} - \phi)\Big)\Big] \quad (48)$$

Figure 22:
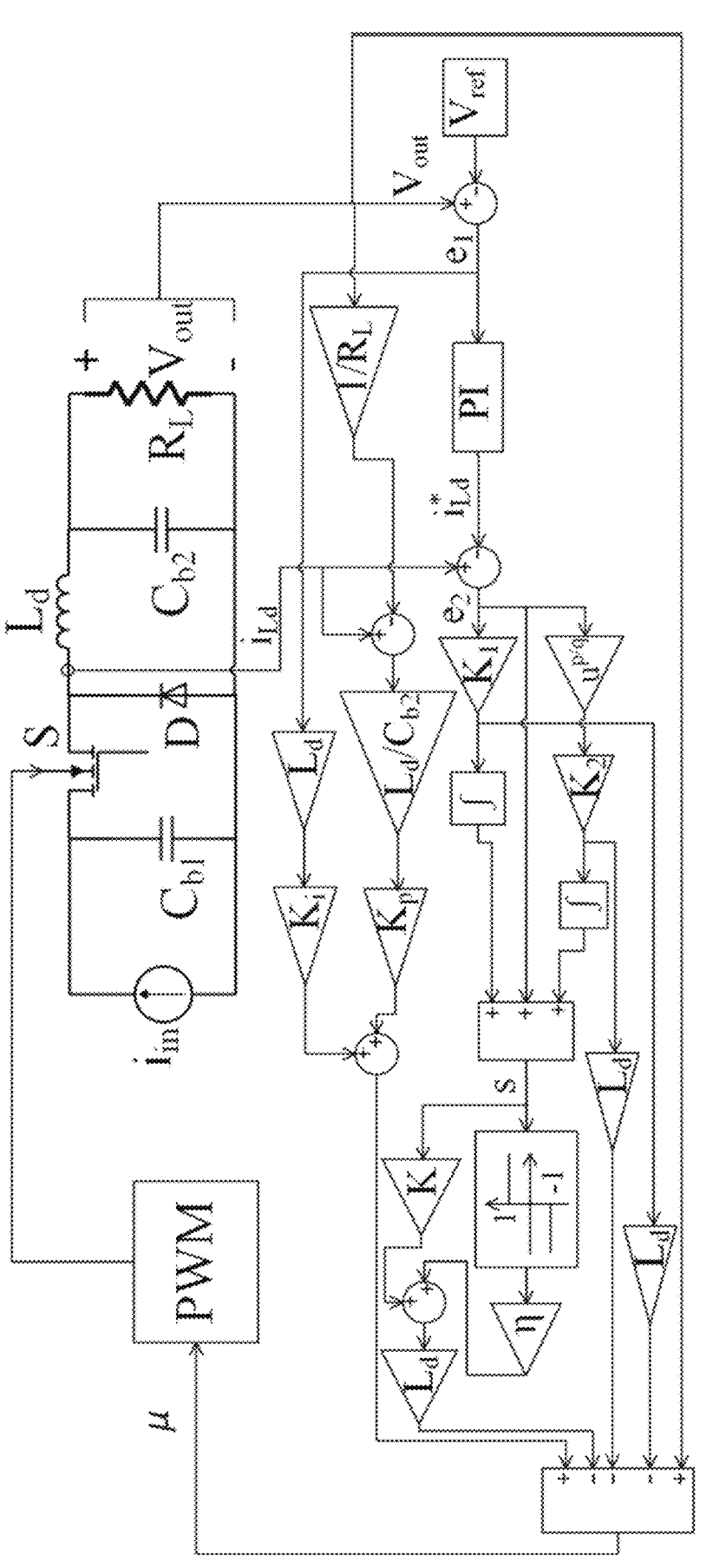
FIG. 22 shows the control block diagram of the PBITSM controller, according to an embodiment of the subject invention.

FIG. 22 is a schematic representation showing the control block diagram of the PBITSM controller, according to an embodiment of the subject invention.

Figure 23:
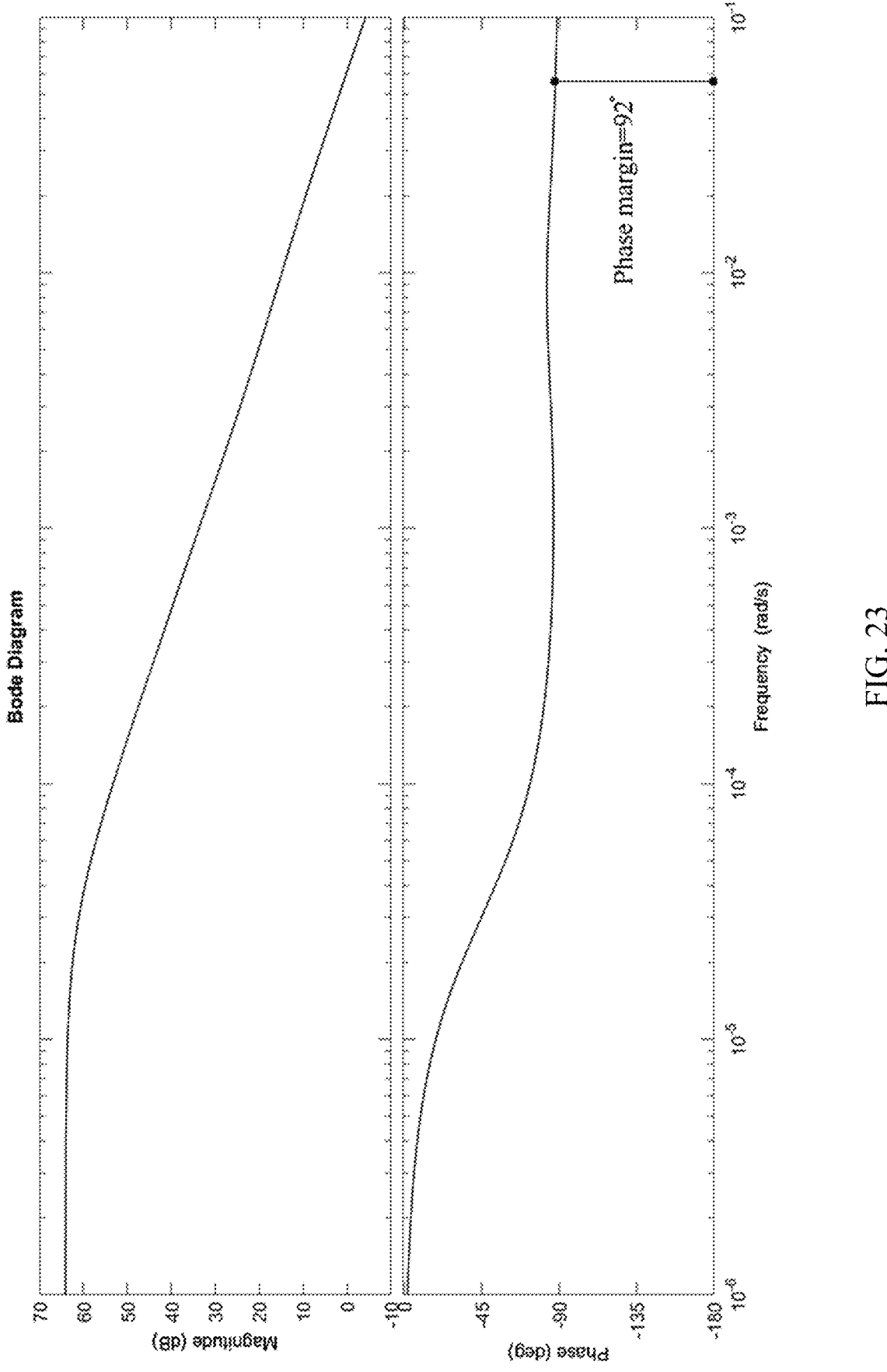
FIG. 23 is the Bode diagram according to the control method, according to an embodiment of the subject invention.

FIG. 23 illustrates the Bode diagram of the control method, showing that the phase margin is 92° and demonstrating the high stability of the control method.

Simulation Results

To validate the effectiveness of the control method of the subject invention, its performance is evaluated under a scenario where the receiver is in motion at a speed of 50 km/h. Subsequently, its performance is compared with that of the conventional PID control method. It is important to note that throughout the testing conditions, the vehicle remains in motion, causing variations in mutual coupling. Details and values of the circuit parameters are provided in the table in FIG. 31.

Figure 24:
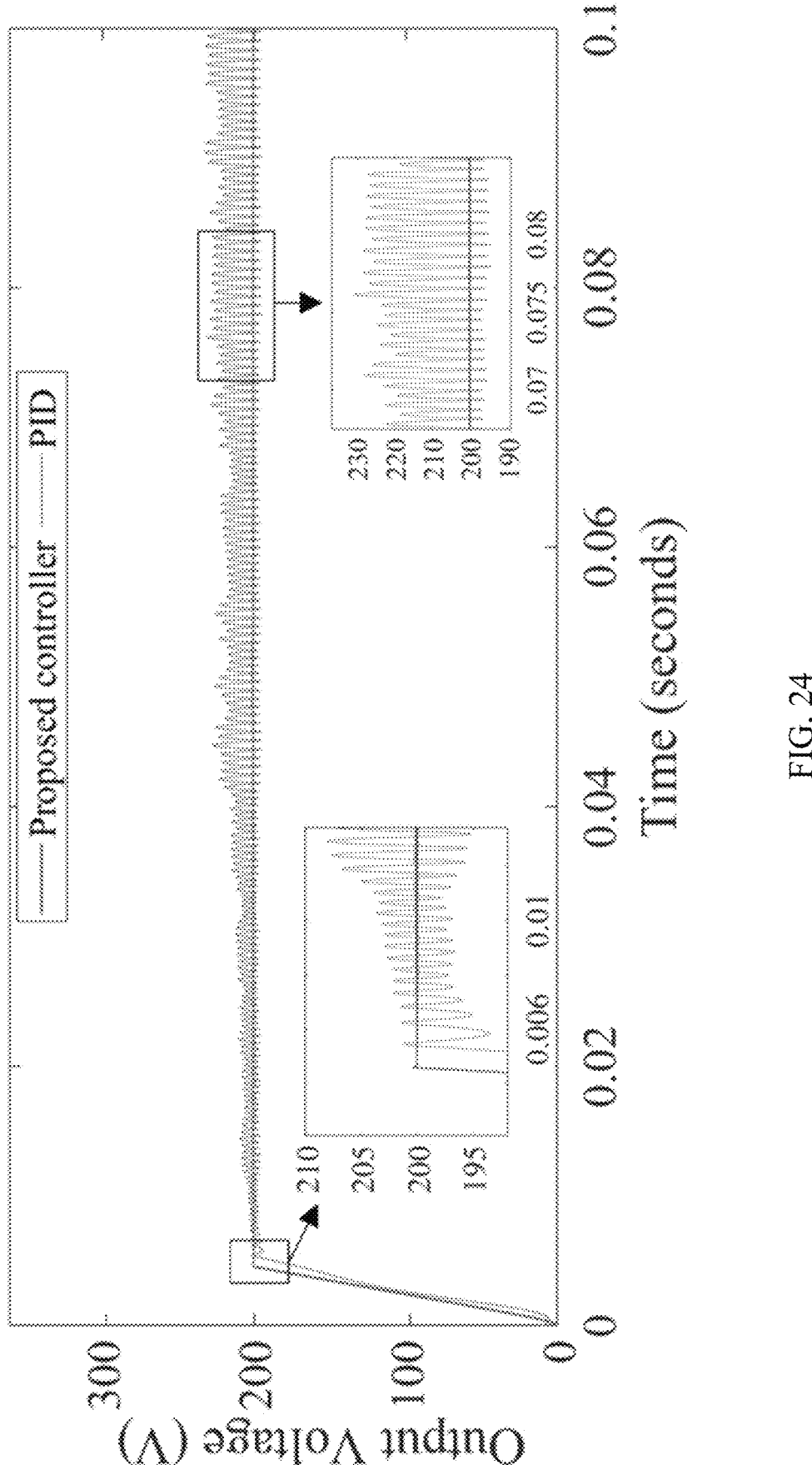
FIG. 24 is a plot diagram showing the output voltage of the DWC system while the receiver is in motion at a speed of 50 km/h, according to an embodiment of the subject invention.

FIG. 24 demonstrates the output voltage behaviors of the DWC system during the vehicle's movement across the transmitter coils at a speed of 50 km/h under various control methods: the control method of the subject invention, the conventional PID control method. The comparison highlights that the control method of the subject invention exhibits superior transient performance, achieving faster settling times without overshooting. Conversely, the conventional PID controller exhibits slower reachability times with overshoot. Additionally, for the control method of the subject invention, the voltage fluctuation of the DWC is nearly 1%, whereas for the PID control method, a voltage ripple of 20% is shown, as depicted in FIG. 24.

Figure 25:
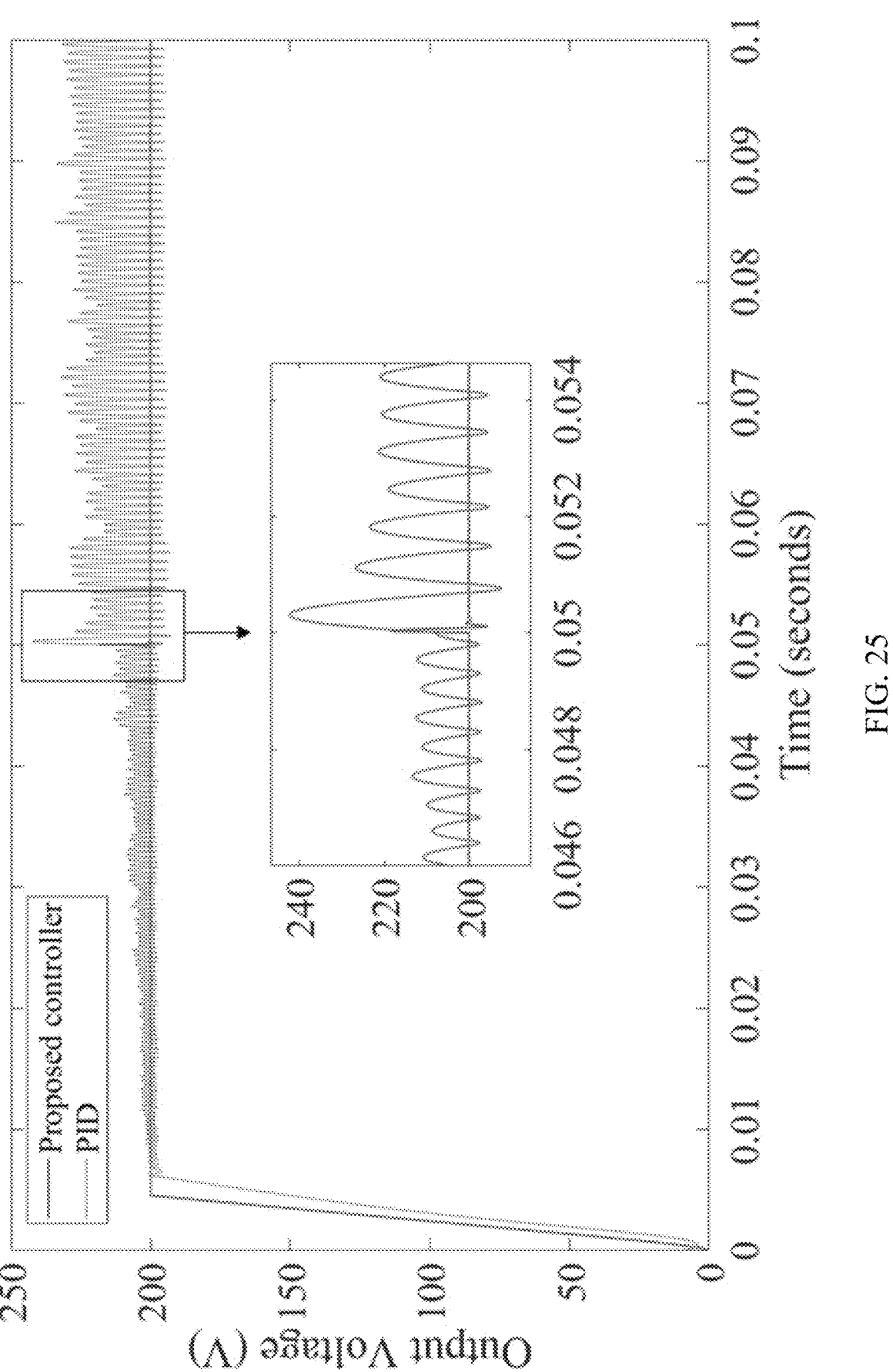
FIG. 25 is a plot diagram showing the output voltage of the DWC system as the vehicle travels at a speed of 50 km/h and the load changes at 0.05 seconds, according to an embodiment of the subject invention.

FIG. 25 depicts the output voltage during the vehicle's motion as the load transitions from 22Ω to 26Ω at 0.05 seconds. The transient response of the control method of the subject invention during load changes surpasses that of the conventional PID control method. The control method of the subject invention demonstrates reduced overshoot and achieves swifter convergence to the reference value. Notably, the voltage ripple for the control method of the subject invention is constrained to 1% under both load conditions, while the voltage ripple for the conventional PID control method escalates from 20% at 22Ω to 30% at 26Ω.

Figure 26:
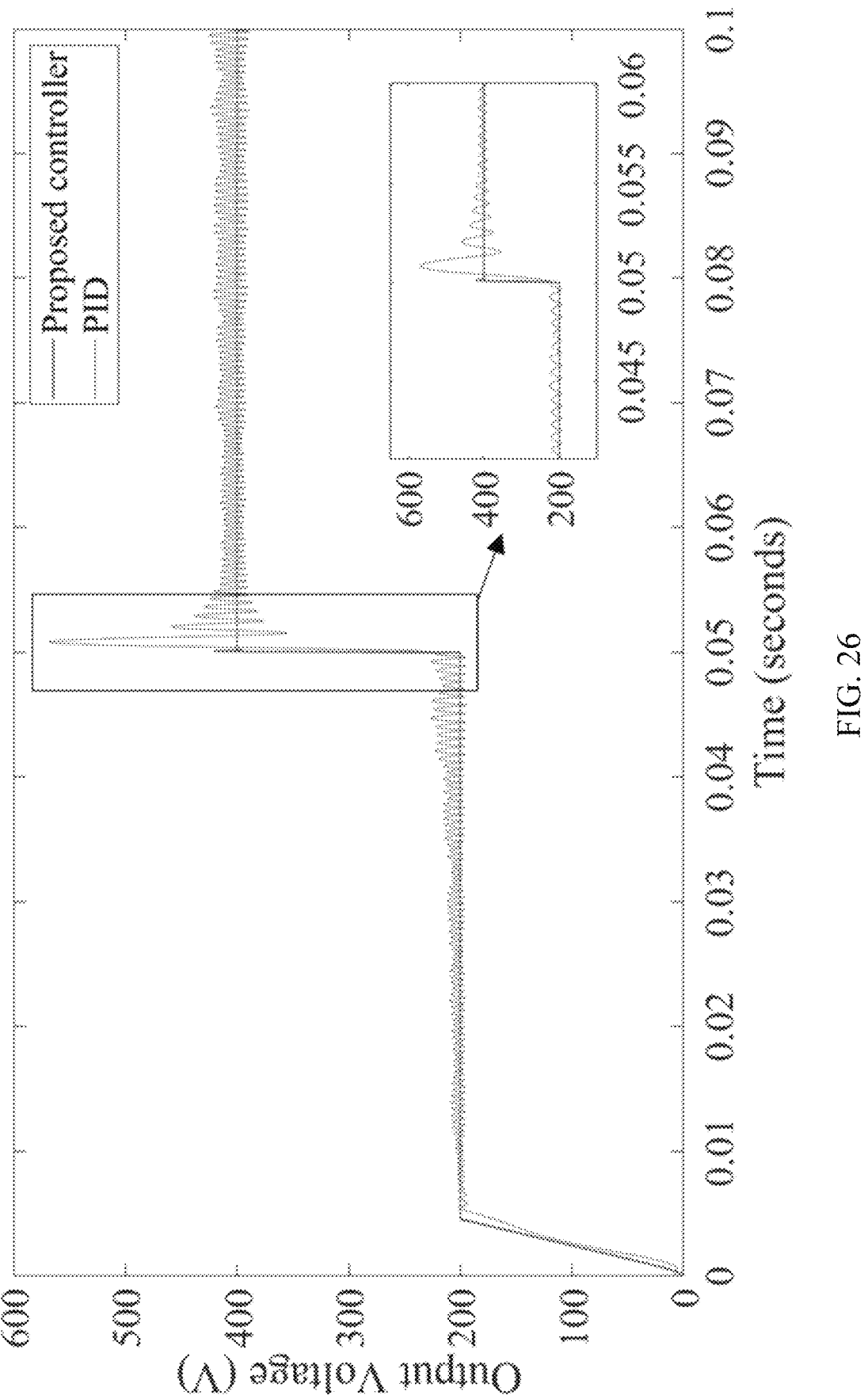
FIG. 26 is a plot diagram showing the output voltage of the DWC system while the vehicle is in motion and the voltage reference value is changing at 0.05 second, according to an embodiment of the subject invention.

In FIG. 26, the output voltage is depicted when the vehicle is in motion, showcasing a transition in the voltage reference from 200V to 250V. The graph highlights the efficiency of the control approach in promptly and seamlessly adapting to the dynamic shift in the reference value. In contrast, the utilization of conventional PID control method leads to significant overshooting, slow convergence towards the 250V target, and noticeable fluctuations in the output voltage. These findings emphasize the superior capability of the control method of the subject invention in maintaining power stability compared to the conventional PID control method, particularly in scenarios involving varying coupling coefficients and simultaneous changes in load or reference values.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (e.g., any subrange within the disclosed range) and specific embodiments therein are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for controlling a dynamic wireless charging system for an electric vehicle, the system comprising:
  a) a transmitter component comprising:
    a-i) a plurality of transmitter pads;
    a-ii) a plurality of transmitter coils positioned within or adjacent to the plurality of transmitter pads and electrically coupled to a power source; and
    a-iii) a series resonant inductor and a parallel resonant capacitor forming part of a double-sided LCC compensation network;

b) a receiver component comprising:
    b-i) a receiver pad;
    b-ii) a receiver coil positioned within or adjacent to the receiver pad and inductively coupled to the plurality of transmitter coils to provide wireless charging of the electric vehicle through mutual inductance;
    b-iii) a series resonant capacitor, a series resonant inductor, and a parallel resonant capacitor forming another part of the double-sided LCC compensation network;
    b-iv) a DC-DC buck converter comprising an input capacitor, an inductor, and an output capacitor;
    b-v) a rectifier coupled to the receiver coil; and
    b-vi) a load coupled to an output of the rectifier; and
  c) means for implementing a passivity-based integral terminal sliding mode (PBITSM) control method employing a secondary side control approach, wherein the means for implementing the PBITSM control method is configured to adjust a duty cycle of the DC-DC buck converter to provide finite-time convergence of a voltage error to a desired value and stabilize an output voltage of the DC-DC buck converter.

2. The system according to claim 1, wherein adjusting the duty cycle further comprises steps of:
  calculating the duty cycle based on the output voltage and the inductor current in the DC-DC buck converter; and
  applying the calculated duty cycle to the DC-DC buck converter.

3. The system according to claim 2, wherein the means for implementing the PBITSM control method is based on a nonlinear sliding-mode control algorithm involving the output voltage, an inductor-current-related term, and sliding-surface error signals.

4. The system according to claim 1, wherein the means for implementing the PBITSM control method is based on an integral terminal sliding mode (ITSM) to improve response speed, robustness, stability of the dynamic wireless charging system, and reduce chattering associated with sliding-mode control.

5. The system according to claim 4, wherein the means for implementing the PBITSM control method is configured to minimize voltage variations arising from changes in coupling coefficient between the transmitter pad mounted on a stationary surface and the receiver pad mounted on the electric vehicle and to constrain voltage ripple to within 1% under varying load conditions.

6. The system according to claim 4, wherein the means for implementing the PBITSM control method is configured to preserve system passivity, thereby enhancing stability of the dynamic wireless charging system under varying operating conditions.

7. The system according to claim 1, wherein the means for implementing the PBITSM control method is based on stages of:
  1) energy shaping, defining a desired energy function for the system; and
  2) damping injection, adding virtual resistances to dissipate oscillations.

8. The system according to claim 7, wherein the means for implementing the PBITSM control method is based on a Lyapunov function, being configured to suppress output voltage fluctuations arising from variations in mutual coupling during dynamic charging of the electric vehicle.

9. The system according to claim 7, wherein the means for implementing the PBITSM control method is implemented within the receiver component, being configured to regulate DC-DC buck converter operation using local voltage and current conditions, thereby eliminating transmitter-receiver communication.

10. The system according to claim 7, wherein the means for implementing the PBITSM control method is configured to efficiently adapt to variable variations in load and vehicle position to maintain stable and continuous power supply to the electric vehicle.

11. A method for controlling a dynamic wireless charging system for an electric vehicle, the method comprising the steps of:

a) providing a transmitter component, the transmitter component comprising:

a-i) generating an alternating magnetic field for transfer of wireless power via a plurality of transmitter pads;

a-ii) positioning a plurality of transmitter coils within or adjacent to the plurality of transmitter pads and electrically coupling them to a power source; and a-iii) employing a series resonant inductor and a parallel resonant capacitor forming part of a double-sided LCC compensation network;

b) providing a receiver component, the receiver component comprising:

b-i) receiving the wireless power from the transmitter component via a receiver pad;

b-ii) positioning a receiver coil within or adjacent to the receiver pad, inductively coupling the receiver coil to the plurality of transmitter coils to facilitate wireless charging of the electric vehicle through mutual inductance;

b-iii) employing a series resonant capacitor, a series resonant inductor, and a parallel resonant capacitor forming another part of the double-sided LCC compensation network;

b-iv) employing a DC-DC buck converter comprising an input capacitor, an inductor, and an output capacitor;

b-v) rectifying power received by the receiver coil using a rectifier; and b-vi) providing a load coupled to the output of the rectifier; and c) controlling the dynamic wireless charging system using means for implementing a passivity-based integral terminal sliding mode (PBITSM) control method employing a secondary side control approach, wherein the means for implementing the PBITSM control method is configured to adjust a duty cycle of the DC-DC buck converter to provide finite-time convergence of a voltage error to a desired value and stabilize an output voltage of the DC-DC buck converter.

12. The method according to claim 11, wherein adjusting the duty cycle further comprises steps of:

calculating the duty cycle based on the output voltage and the inductor current in the DC-DC buck converter; and applying the calculated duty cycle to the DC-DC buck converter.

13. The method according to claim 12, wherein the means for implementing the PBITSM control method is based on a nonlinear sliding-mode control algorithm involving the output voltage, an inductor-current-related term, and sliding-surface error signals.

14. The method according to claim 11, wherein the means for implementing the PBITSM control method is based on an integral terminal sliding mode (ITSM) to improve response speed, robustness, stability of the dynamic wireless charging system, and reduce chattering associated with sliding-mode control.

15. The method according to claim 14, wherein the means for implementing the PBITSM control method is configured to minimize voltage variations arising from changes in coupling coefficient between the transmitter pad mounted on a stationary surface and the receiver pad mounted on the electric vehicle and to constrain voltage ripple to within 1% under varying load conditions.

16. The method according to claim 14, wherein the means for implementing the PBITSM control method is configured to preserve system passivity, thereby enhancing stability of the dynamic wireless charging system under varying operating conditions.

17. The method according to claim 11, wherein the means for implementing the PBITSM control method is based on stages of:

1) energy shaping, defining a desired energy function for the system; and 2) damping injection, adding virtual resistances to dissipate oscillations.

18. The method according to claim 17, wherein the means for implementing the PBITSM control method is based on a Lyapunov function, being configured to suppress output voltage fluctuations arising from variations in mutual coupling during dynamic charging of the electric vehicle.

19. The method according to claim 17, wherein the means for implementing the PBITSM control method is implemented within the receiver component, being configured to regulate DC-DC buck converter operation using local voltage and current conditions, thereby eliminating transmitter-receiver communication and being configured to efficiently adapt to variable variations in load and vehicle position to maintain stable and continuous power supply to the electric vehicle.

20. A system for controlling a dynamic wireless charging system for an electric vehicle, the system comprising:

a) a transmitter component comprising:

a-i) a plurality of transmitter pads;

a-ii) a plurality of transmitter coils positioned within or adjacent to the plurality of transmitter pads and electrically coupled to a power source; and a-iii) a series resonant inductor and a parallel resonant capacitor forming part of a double-sided LCC compensation network;

b) a receiver component comprising:

b-i) a receiver pad;

b-ii) a receiver coil positioned within or adjacent to the receiver pad and inductively coupled to the plurality of transmitter coils to provide wireless charging of the electric vehicle through mutual inductance;

b-iii) a series resonant capacitor, a series resonant inductor, and a parallel resonant capacitor forming another part of the double-sided LCC compensation network;

b-iv) a DC-DC buck converter comprising an input capacitor, an inductor, and an output capacitor;

b-v) a rectifier coupled to the receiver coil; and b-vi) a load coupled to an output of the rectifier; and c) means for implementing a passivity-based integral terminal sliding mode (PBITSM) control method employing a secondary side control approach, wherein the means for implementing the PBITSM control method is configured to adjust a duty cycle of the DC-DC buck converter to provide finite-time convergence of a voltage error to a desired value and stabilize an output voltage of the DC-DC buck converter, wherein adjusting the duty cycle further comprises steps of:

calculating the duty cycle based on the output voltage and the inductor current in the DC-DC buck converter; and applying the calculated duty cycle to the DC-DC buck converter, wherein the means for implementing the PBITSM control method is based on a nonlinear sliding-mode control algorithm involving the output voltage, an inductor-current-related term, and sliding-surface error signals, wherein the means for implementing the PBITSM control method is based on an integral terminal sliding mode (ITSM) to improve response speed, robustness, stability of the dynamic wireless charging system, and reduce chattering associated with sliding-mode control, wherein the means for implementing the PBITSM control method is configured to minimize voltage variations arising from changes in coupling coefficient between the transmitter pad mounted on a stationary surface and the receiver pad mounted on the electric vehicle and to constrain voltage ripple to within 1% under varying load conditions, wherein the means for implementing the PBITSM control method is configured to preserve system passivity, thereby enhancing stability of the dynamic wireless charging system under varying operating conditions, wherein the means for implementing the PBITSM control method is based on stages of:

1) energy shaping, defining a desired energy function for the system; and 2) damping injection, adding virtual resistances to dissipate oscillations, wherein the means for implementing the PBITSM control method is based on a Lyapunov function, being configured to suppress output voltage fluctuations arising from variations in mutual coupling during dynamic charging of the electric vehicle, wherein the means for implementing the PBITSM control method is implemented within the receiver component, being configured to regulate DC-DC buck converter operation using local voltage and current conditions, thereby eliminating transmitter-receiver communication, and wherein the means for implementing the PBITSM control method is configured to efficiently adapt to variable variations in load and vehicle position to maintain stable and continuous power supply to the electric vehicle.

* * * * *